United States Patent
Rode et al.

(10) Patent No.: US 9,909,609 B2
(45) Date of Patent: *Mar. 6, 2018

(54) SYSTEMS AND METHODS FOR PRELOADING A BEARING AND ALIGNING A LOCK NUT

(71) Applicant: TEMPER AXLE PRODUCTS CORPORATION, Fonda, NY (US)

(72) Inventors: John E. Rode, Fonda, NY (US); Sean E. Strait, Fort Plain, NY (US); Ronald George Wilson, Gloversville, NY (US)

(73) Assignee: Temper Axle Products Corporation, Fonda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,315

(22) Filed: Jan. 27, 2017

(65) Prior Publication Data

US 2017/0152883 A1    Jun. 1, 2017

Related U.S. Application Data

(63) Continuation of application No. 14/946,168, filed on Nov. 19, 2015, now Pat. No. 9,587,667, which is a
(Continued)

(51) Int. Cl.
*F16B 39/32* (2006.01)
*F16C 25/08* (2006.01)
(Continued)

(52) U.S. Cl.
CPC ............ *F16B 39/32* (2013.01); *B25B 27/14* (2013.01); *F16B 39/10* (2013.01); *F16C 25/08* (2013.01);
(Continued)

(58) Field of Classification Search
CPC .................................. F16B 39/10; F16B 39/32
(Continued)

(56) References Cited

U.S. PATENT DOCUMENTS

| 518,328 A | 4/1894 | Oakey |
| 578,276 A | 3/1897 | Strauss |

(Continued)

FOREIGN PATENT DOCUMENTS

| DE | 3905385 A1 | 8/1990 |
| EP | 1367299 A2 | 3/2003 |

(Continued)

OTHER PUBLICATIONS

Stemco—Pro-Torq Advanced Axle Spindle Nuts, Installation Procedure and Wheel Bearing Adjustment.
(Continued)

*Primary Examiner* — Roberta S DeLisle
(74) *Attorney, Agent, or Firm* — Heslin Rothenberg Farley & Mesiti P.C.; Nicholas Mesiti, Esq.; Victor A. Cardona, Esq.

(57) ABSTRACT

A lock nut system includes a nut, a keeper engagement with the nut to inhibit movement of the keeper relative to the nut, and a keeper retaining member. The keeper has a radially inner side configured to engage a shaft to inhibit rotational movement of the nut relative to the shaft when the keeper engages the nut and a radially inner side engages the shaft. The keeper retaining member is secured to the keeper and is engageable with the nut to hold a keeper axially such that keeper is engaged with the nut. A cover member is located on an opposite side of the keeper retaining member relative to the nut and engaged to the keeper retaining member to inhibit a separation of the cover member from the keeper retaining member in such that that the separation of the cover member from the keeper retaining member provides a visual indication to a user.

17 Claims, 35 Drawing Sheets

Related U.S. Application Data continuation of application No. 14/455,143, filed on Aug. 8, 2014, now Pat. No. 9,217,461.

(60) Provisional application No. 61/970,795, filed on Mar. 26, 2014.

(51) Int. Cl.
*B25B 27/14* (2006.01)
*F16B 39/10* (2006.01)

(52) U.S. Cl.
CPC ...... *F16C 2229/00* (2013.01); *F16C 2326/01* (2013.01)

(58) Field of Classification Search
USPC ........................................................ 411/204
See application file for complete search history.

(56) References Cited

U.S. PATENT DOCUMENTS

| | | | |
|---|---|---|---|
| 1,352,643 | A | 9/1920 | Young |
| 1,366,273 | A | 1/1921 | Nettlefold |
| 1,373,489 | A | 4/1921 | Royal-Cochran |
| 1,384,655 | A | 7/1921 | Allmon |
| 1,440,938 | A | 1/1923 | Sieroslawski |
| 1,755,807 | A | 4/1930 | Boles |
| 1,758,515 | A | 5/1930 | Heiermann |
| 1,813,640 | A | 7/1931 | Rossetti |
| 2,301,786 | A | 11/1942 | Millermaster |
| 2,426,219 | A | 8/1947 | Jackson |
| 2,755,698 | A | 7/1956 | Wurzel |
| 2,769,360 | A | 11/1956 | Woodford |
| 2,813,732 | A | 11/1957 | Hird |
| 3,144,909 | A | 8/1964 | Hart et al. |
| 3,241,409 | A | 3/1966 | Raptis |
| 3,316,952 | A | 5/1967 | Hollinger |
| 3,464,474 | A | 9/1969 | Jansen |
| 3,480,300 | A | 11/1969 | Jeffrey et al. |
| 3,522,830 | A | 8/1970 | Blizard |
| 3,566,721 | A | 3/1971 | Nockleby |
| 3,581,609 | A | 6/1971 | Greenwood |
| 3,620,108 | A | 11/1971 | Door |
| 3,664,226 | A | 5/1972 | Gonzalez |
| 3,678,981 | A | 7/1972 | Heyworth |
| 3,742,568 | A | 7/1973 | Hahlbeck |
| 3,762,455 | A | 10/1973 | Anderson, Jr. |
| 3,844,323 | A | 10/1974 | Anderson, Jr. |
| 3,986,750 | A | 10/1976 | Trent et al. |
| 4,048,897 | A | 9/1977 | Price, Jr. |
| 4,054,999 | A | 10/1977 | Harbottle |
| 4,210,372 | A | 7/1980 | McGee et al. |
| 4,305,438 | A | 12/1981 | Spinosa et al. |
| 4,436,468 | A | 3/1984 | Ozaki et al. |
| 4,593,924 | A | 6/1986 | Cabeza |
| 4,642,866 | A | 2/1987 | Murtaugh |
| 4,689,865 | A | 9/1987 | Chamblee |
| 4,812,094 | A | 3/1989 | Grube |
| 4,958,941 | A | 9/1990 | Imanari |
| 4,971,501 | A | 11/1990 | Chavez |
| 5,011,306 | A | 4/1991 | Martinie |
| 5,058,424 | A | 10/1991 | O'Hara |
| 5,070,621 | A | 12/1991 | Butler et al. |
| 5,129,156 | A | 7/1992 | Walker |
| 5,180,265 | A | 1/1993 | Weise |
| 5,251,995 | A | 10/1993 | Chi |
| 5,348,349 | A | 9/1994 | Sloane |
| 5,349,736 | A | 9/1994 | Rubino et al. |
| 5,362,111 | A | 11/1994 | Harbin |
| 5,366,300 | A | 11/1994 | Deane et al. |
| 5,533,849 | A | 7/1996 | Burdick |
| 5,535,517 | A | 7/1996 | Rode |
| 5,573,311 | A | 11/1996 | Clohessy |
| 5,597,058 | A | 1/1997 | Ewer |
| 5,749,386 | A | 5/1998 | Samuel, Jr. |
| 5,877,433 | A | 3/1999 | Matsuzaki et al. |
| 5,882,044 | A | 3/1999 | Sloane |
| 5,934,853 | A | 8/1999 | Junkers |
| 6,042,273 | A | 3/2000 | Thrasher |
| 6,058,767 | A | 5/2000 | Calvin |
| 6,065,920 | A | 5/2000 | Becker et al. |
| 6,095,735 | A | 8/2000 | Weinstein et al. |
| 6,135,642 | A | 10/2000 | Burch |
| 6,186,032 | B1 | 2/2001 | Raines |
| 6,286,374 | B1 | 9/2001 | Kudo et al. |
| 6,520,710 | B2 | 2/2003 | Wells |
| 6,598,500 | B1 | 7/2003 | Chivington |
| 6,601,503 | B2 | 8/2003 | Scholzig et al. |
| 6,622,397 | B1 | 9/2003 | Knoble |
| 6,637,297 | B1 | 10/2003 | Mlynarczyk |
| 6,749,386 | B2 | 6/2004 | Harris |
| 6,857,665 | B2 | 2/2005 | Vyse et al. |
| 6,886,227 | B1 | 5/2005 | Hedrick |
| 6,971,802 | B2 | 12/2005 | Vezina |
| 6,976,817 | B1 | 12/2005 | Grainger |
| 6,988,832 | B2 | 1/2006 | Dewachter |
| 6,993,852 | B2 | 2/2006 | Russell et al. |
| 7,303,367 | B2 | 12/2007 | Rode |
| 7,343,836 | B1 | 3/2008 | Ward |
| 7,346,985 | B1 | 3/2008 | Strait |
| 7,389,579 | B2 | 6/2008 | Rode |
| 7,428,779 | B2 | 9/2008 | Smith et al. |
| 7,559,135 | B2 | 7/2009 | Rode |
| 7,625,164 | B2 | 12/2009 | Rode |
| 7,927,052 | B1 | 4/2011 | Varden |
| 8,006,573 | B1 | 8/2011 | Rode |
| 8,316,530 | B2 | 11/2012 | Rode |
| 8,328,486 | B2 | 12/2012 | Cox |
| 8,359,733 | B2 | 1/2013 | Rode |
| 8,650,757 | B2 | 2/2014 | Rode |
| 8,904,646 | B2 | 12/2014 | Rode |
| 8,961,090 | B2 | 2/2015 | Rode |
| 9,200,672 | B2 | 12/2015 | Rode |
| 9,200,673 | B2 | 12/2015 | Rode |
| 9,217,461 | B2 | 12/2015 | Rode |
| 2002/0110414 | A1 | 8/2002 | Wells |
| 2003/0035699 | A1 | 2/2003 | Harris |
| 2004/0086354 | A1 | 5/2004 | Harris |
| 2004/0089113 | A1 | 5/2004 | Morgan |
| 2005/0025604 | A1 | 2/2005 | Slesinski |
| 2005/0207865 | A1 | 9/2005 | Disantis et al. |
| 2006/0008340 | A1 | 1/2006 | Cox |
| 2009/0003963 | A1 | 1/2009 | Winker et al. |
| 2010/0232902 | A1 | 9/2010 | George et al. |
| 2010/0326205 | A1 | 12/2010 | Rode |
| 2011/0097174 | A1 | 4/2011 | Varden |
| 2015/0336226 | A1 | 11/2015 | Rode |
| 2016/0053806 | A1 | 2/2016 | Rode |
| 2016/0076580 | A1 | 3/2016 | Rode |
| 2016/0084316 | A1 | 3/2016 | Rode |

FOREIGN PATENT DOCUMENTS

| | | | |
|---|---|---|---|
| GB | 990553 | A | 4/1965 |
| GB | 2286231 | A | 6/1995 |
| GB | 2435499 | B | 1/2007 |
| GB | 2434621 | B | 10/2008 |
| WO | 02/08618 | A1 | 1/2002 |
| WO | 2008/003919 | A1 | 1/2008 |
| WO | 2015/147903 | A1 | 10/2015 |

OTHER PUBLICATIONS

"STEMCO Pro-Torq® Advanced Axle Spindle Nuts 09-571-0006," Instruction guide, Copyright Aug. 2003, 2 pages.
"STEMCO Pro-Torq(R) 571-2970," Copyright 2005 STEMCO LP, 2 pages.
"Timkin Products-Bearings," vol. 1, Issue 6; 2 pages, [http://www.timken.com/products/bearings/techtips/tip6.asp].
Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preloa.

(56) References Cited

OTHER PUBLICATIONS

"Forming and Shaping Processes Compaction and Sintering (Pulvepresning)," Copyright Institut for Precesteknik Danmarks Tekniske Universitet 1996, (http://www.ipt.dtusdk/—ap/ingpro/_forming/ppm/htm).

STEMCO, Pro-Torq, An Axle Spindle Nut System for Today's Fleets. Mar. 2003; download from http://www.stemco.com, pp. 38-41.

STEMCO, Pro-Torq, An Axle Spindle Nut System for Today's Fleets. Mar. 2003; download from http://www.stemco.com, pp. 57-64.

What is Powder Metallurgy? Dec. 2004, 2 pages. (hhttps://www.mpif org/technology/whatis.html).

www.stemco.com/f/qbin/Quick_Reference_Catalog.pdf—STEMCO Quality Bearing Reference Guide—Table of Contents. Complete document available at http://www.stemco.com/literature-download/.

http://www.stemco.com/product/pro-torz-axle-spindle-nuts/—Stemco—Pro-Torq® Axle Spindle Nuts.

Supplementary European Search Report for corresponding EP application No. 14887106 completed on Sep. 20, 2017.

SYSTEMS AND METHODS FOR PRELOADING A BEARING AND ALIGNING A LOCK NUT

CROSS-REFERENCE TO RELATED APPLICATION

This application is a continuation of U.S. Ser. No. 14/946,168 filed on Nov. 19, 2015, titled "Systems and Methods for Preloading a Bearing and Aligning a Lock Nut", which is a continuation of U.S. Pat. No. 9,217,461 issued on Dec. 22, 2015 (U.S. Ser. No. 14/455,143 filed on Aug. 8, 2014), titled "Systems and Methods for Preloading a Bearing and Aligning a Lock Nut", which claims priority to U.S. Provisional Patent Application Ser. No. 61/970,795, filed on Mar. 26, 2014, titled "Systems and Methods for Preloading A Bearing and Aligning A Lock Nut", the entire disclosures of which are incorporated herein by reference.

This application relates to U.S. Ser. No. 11/029,521, filed on Jan. 5, 2005, titled "Lock Nut System" now U.S. Pat. No. 7,303,367 issued Dec. 4, 2007, the entire disclosure of which is incorporated herein by reference.

This application relates to U.S. Ser. No. 11/738,041, filed on Apr. 20, 2007, titled "Lock Nut System" now U.S. Pat. No. 7,625,164 issued Dec. 1, 2009, the entire disclosure of which is incorporated herein by reference.

This application relates to U.S. application Ser. No. 11/341,948, filed on Jan. 27, 2006, titled "Method and Apparatus For Preloading A Bearing," U.S. Pat. No. 7,559,135 issued Jul. 14, 2009, the entire disclosure of which is incorporated herein by reference.

This application relates to U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, the entire disclosure of which is incorporated herein by reference.

This application relates to U.S. application Ser. No. 12/492,826, filed Jun. 26, 2009, and titled "Systems and Methods For Preloading a Bearing and Aligning A Lock Nut", issued as U.S. Pat. No. 8,316,530 on Nov. 27, 2012, the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

It is important that teeth of a locking member engage teeth of the lock nut such that the locking member is positioned to allow it to engage a slot of the shaft. The nut must be aligned to allow such engagement by selective rotation of the nut to a particular position such that the teeth of the nut and the teeth of the locking member when engaged allow an engaging portion of the locking member to engage a slot of the shaft. Rotation of the nut may be performed during the preloading of a bearing and the degree of rotation allowed may depend on the amount of compressive force applied to a bearing or hub during the preloading of the bearing and the method of application of such force.

Once an adjustment has been made to axle bearings to maximize the life of such bearings it is important to maintain the adjustment made. Further, it is desirable to ascertain from a visual inspection whether the adjustment has been altered without the need for actual measurement of a bearing's preload. The ability to maintain a proper preload and to verify that no additional adjustment has been made allows an original equipment manufacturer (i.e., OEM), such as an auto manufacturer, to provide a warranty on bearing systems which have not been adjusted after they have left the factory.

Thus, a need exists for providing accurate and repeatable procedures and devices for providing and adjusting bearing preload and for adjusting lock nut systems configured to retain preloaded bearings.

SUMMARY OF THE INVENTION

The present invention provides, in a first aspect, a lock nut system including a nut, a keeper engageable with the nut to inhibit movement of the keeper relative to the nut, and a keeper retaining member. The keeper has a radially inner side configured to engage a shaft to inhibit rotational movement of the nut relative to the shaft when the keeper engages the nut and a radially inner side engages the shaft. The keeper retaining member is secured to the keeper and is engageable with the nut to hold the keeper axially such that keeper is engaged with the nut. A cover member is located on an opposite side of the keeper retaining member relative to the nut and is engaged to the keeper retaining member to inhibit a separation of the cover member from the keeper retaining member and such that that the separation of the cover member from the keeper retaining member provides a visual indication to a user.

The present invention provides, in a second aspect, a system for use in securing a lock nut to a shaft which includes a keeper having keeper teeth engagable with a lock nut to inhibit movement of the keeper relative to the nut. The keeper has a radially inner side configured to engage a shaft to inhibit rotational movement of the nut relative to the shaft when the keeper engages the nut and the radially inner side engages the shaft. The keeper retaining member is secured to the keeper and the retaining member has engaging teeth engagable with the nut to hold the keeper axially such that the keeper is engaged with the nut. A cover member is located on an opposite side of the keeper retaining member relative to the keeper teeth and engaging teeth and engaged to the keeper retaining member to inhibit a separation of the cover member from the retaining member and such that the separation of the cover member from the retaining member provides a visual indication to a user.

The present invention provides, in a third aspect, a method for use in providing a load on a bearing mounted to a shaft which includes engaging a lock nut on a shaft at a desired preload of a bearing mounted on the shaft and engaging a keeper with the nut to inhibit movement of the keeper relative to the nut. A radially inner side of the keeper is engaged with the shaft to inhibit rotational movement of the nut relative to the shaft. A retaining member connected to the keeper is engaged with the nut to hold the keeper axially such that the keeper is engaged with the nut. A cover member is located on an opposite side of the keeper retaining member relative to the nut and engages the cover member to the keeper retaining member to inhibit a separation of the cover member such that the separation of the cover member from the retaining member provides a visual indication to a user.

The present invention provides, in a fourth aspect, an apparatus for use in connecting a cover member to a retaining member coupled to a nut mounted to shaft which includes a plurality of circumferentially spaced pressing members extending axially from a main body portion. A contacting portion is coupled to the main body portion and has a plurality of openings aligned with the pressing members to allow a first pressing member of the pressing members to extend through the contacting portion to contact a tab of a cover member to deform the tab toward a retaining member coupled to a nut mounted on a shaft.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, system and methods for adjusting bearings mounted on a shaft and aligning lock nuts for retaining such bearings are provided.

Figure 1:
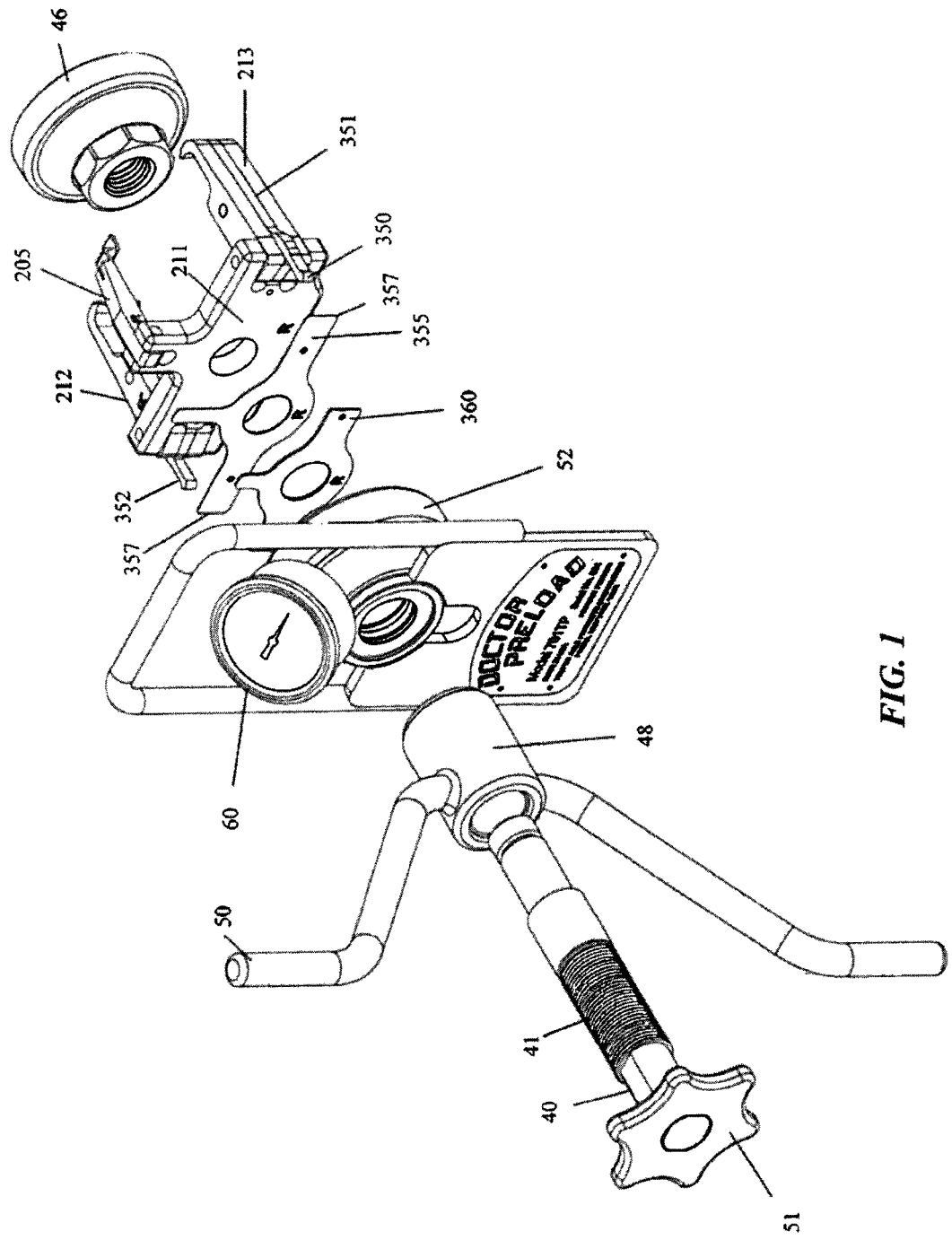
FIG. 1 is perspective exploded view, of a wheel hub assembly engaging a bearing preload apparatus according to an aspect of the invention.
Figure 2:
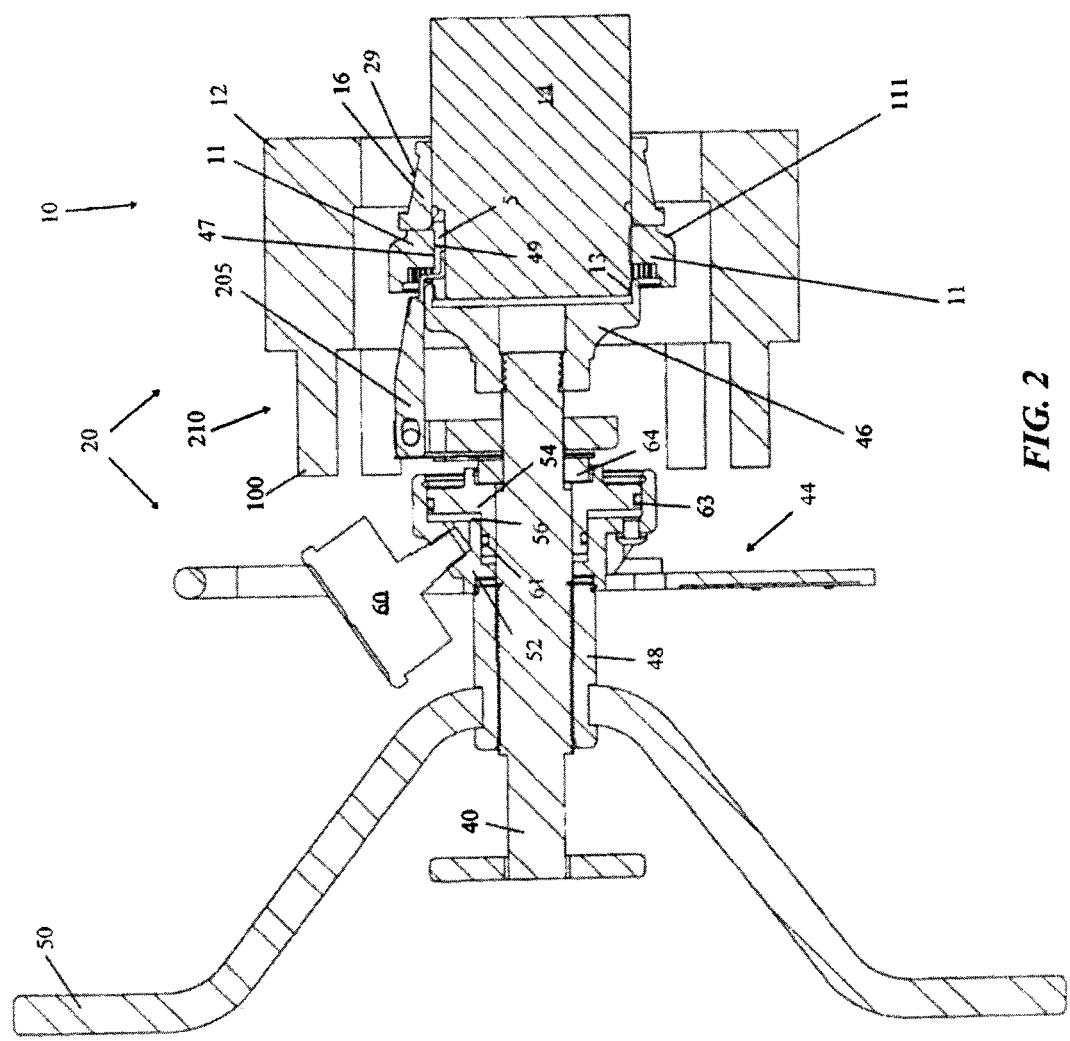
FIG. 2 is a right side elevation view, partially in cross section, of the assembly shown in FIG. 1.

In an exemplary embodiment depicted in FIGS. 1-2, a wheel hub assembly 10 engages a bearing preload apparatus 20, as disclosed in co-owned U.S. Pat. No. 8,316,530 issued on Nov. 27, 2012 titled "Systems And Methods For Preloading A Bearing And Aligning A Lock Nut", incorporated herein by reference. A section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIGS. 1-2, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

As shown in FIGS. 1-2, as is typical of bearings, outboard bearing 16 includes an inner race (or cone) (not shown), an outer race (or cup) (not shown), a plurality of rollers (not shown), and a roller cage (not shown). Similarly, an inboard bearing (not shown) includes an inner race (or cone) (not shown), an outer race (or cup) (not shown), a plurality of rollers (not shown), and roller cage (not shown). As shown in FIG. 2, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 3, 6, 28 and 29 for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Nut 11 may include a plurality of engaging teeth 511 extending circumferentially around an inner radial surface of nut 11. For example, nut 11 may include 60 engaging teeth. Nut 11 may also include a shoulder 524 configured to receive a keeper 530. For example, shoulder 524 may be spaced from an outer surface 522 of nut 11 in an axial direction relative to nut 11 such that an axial dimension of keeper 530 relative to nut 11 is received between outer surface 522 and shoulder 524. Shoulder 524 may also abut and support keeper 530 in an axial direction. Nut 11 may be molded or formed of powdered metal, for example.

Figure 3:
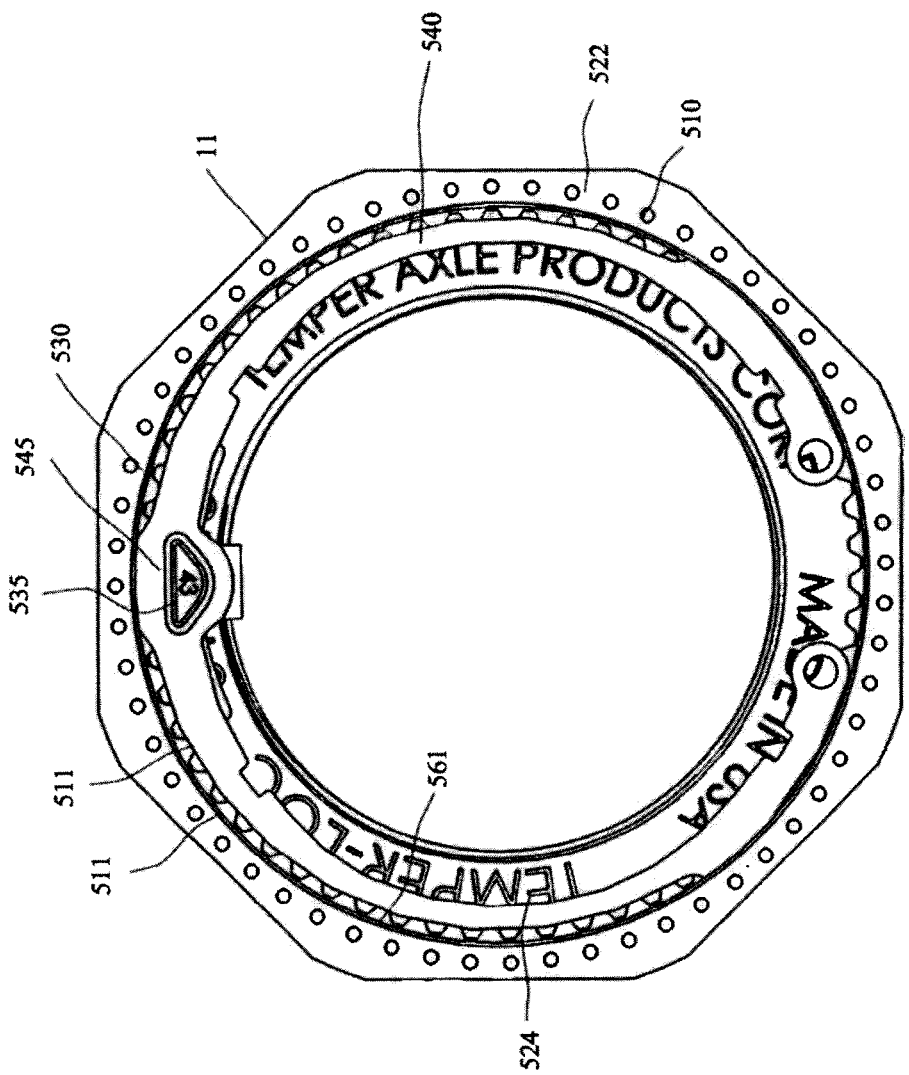
FIG. 3 is a perspective view of a lock nut system which includes a lock nut having a keeper and keeper retaining member engaged with the nut.
Figure 4:
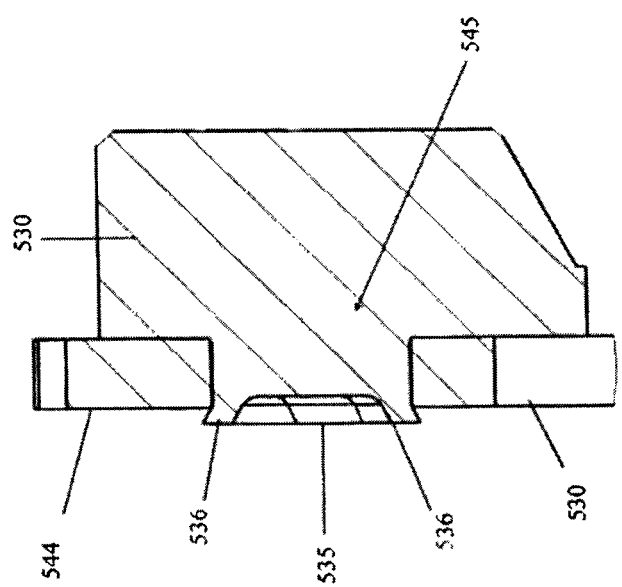
FIG. 4 is a close up view of a portion of the keeper retaining member at the location where the keeper is connected thereto.

As depicted in FIG. 3, a keeper 530 is engageable with retaining nut 11 and is connected to a keeper retaining member 540. A projection 535 of keeper 530 extends through an opening 545 in retaining member 540 when connected as depicted in FIG. 4, which is a close up view showing the connection of the keeper and keeper retaining member. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. For example, as best depicted in FIG. 4, the deformation of projection 535 may cause edges 536 of projection 535 to extend over a top surface of keeper 530 thereby connecting projection 535 and keeper 530 to retaining member 540.

Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIG. 2), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, slot 561 may extend circumferentially (e.g., completely or partially) around nut 11. Slot 60 may be located between engaging teeth 120 and outer surface 522 of nut 11. Also, slot 60 may have a radial depth of about 0.050 inches. A first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 520 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. A user may move the legs (i.e., first leg 542 and second leg 543) toward one another as described above to allow the retaining member to be received in slot 561. In one example, a user may use a tool (e.g., a tool made for this specific purpose or a type of pliers such as needle nose pliers) which is inserted into openings 611 and 612 (FIG. 5) to allow the tool to grip the legs to move ends 610 toward one another thereby allowing the legs to be inserted into slot 561.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567 as depicted in FIG. 5 for example.

Figure 5:
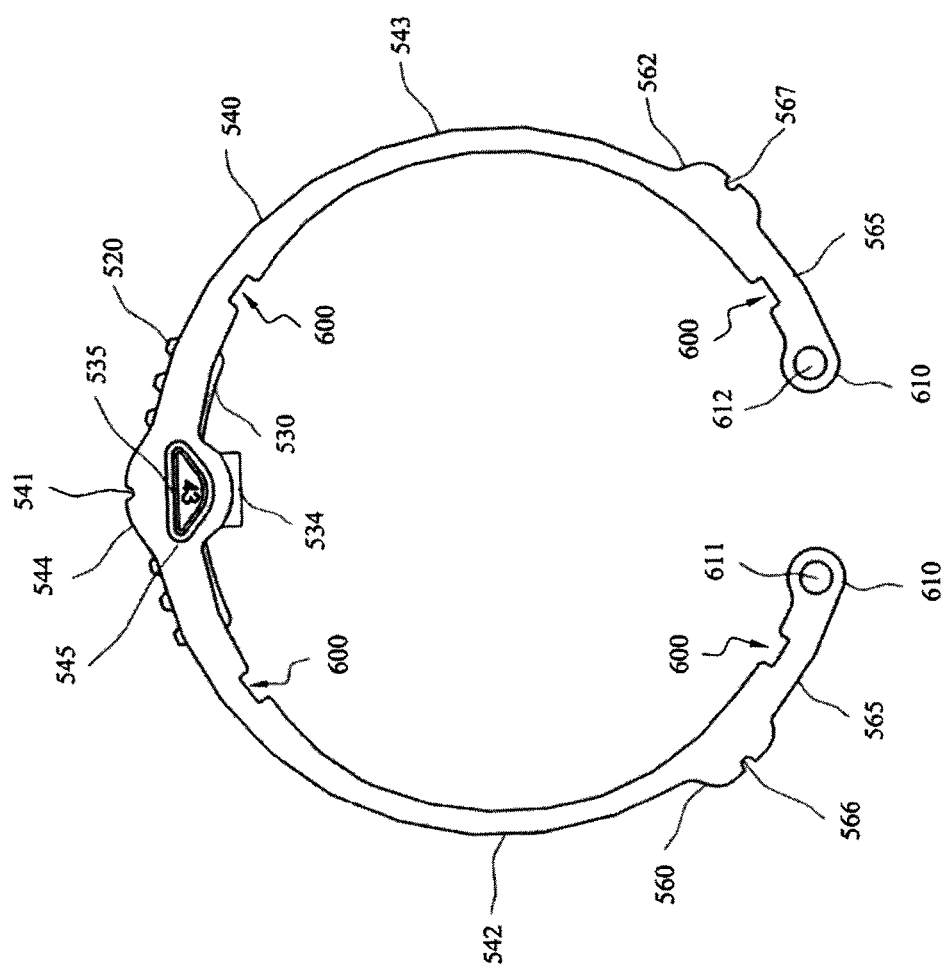
FIG. 5 is a side elevational view of the keeper retaining member of FIG. 3.
Figure 6:
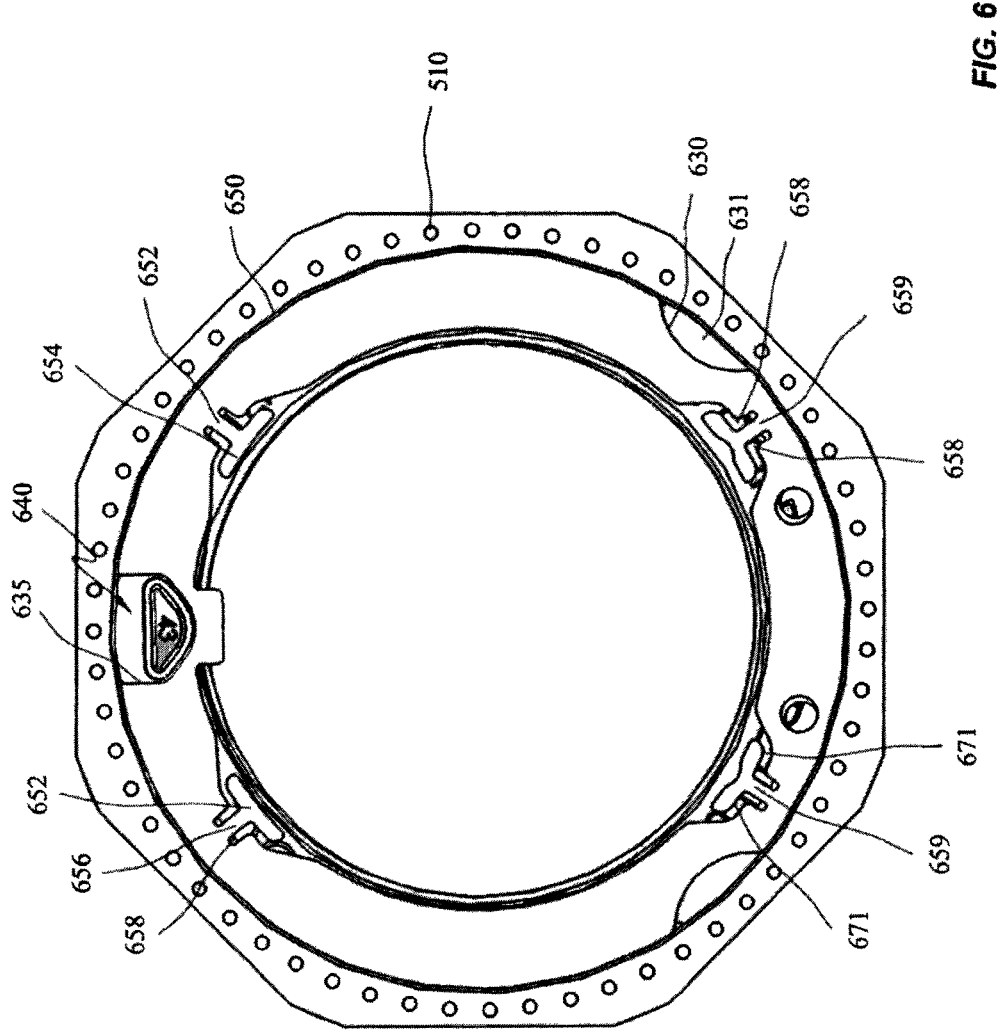
FIG. 6 is a side elevational view of the lock nut system of FIG. 3 with a cover member located adjacent the keeper retaining member.

Retaining member 540 may also include notches 600 on opposite sides of keeper 530 and spaced from ends 610 of retaining member 540 with the notches configured (e.g., shaped and dimensioned) to receive tabs 620 of a cover member or cover plate 650 as depicted in FIGS. 5 and 6.

A cover member, such as a cover plate 650, may be installed after retaining member 540 is engaged with nut 11 as described above, and the cover plate may inhibit access to the retaining member due to the connection between cover plate 650 and retaining member 540, such that any removal of the cover plate damages or deforms cover plate 650. In particular, the cover plate is configured (e.g., shaped, dimensioned and formed of a material) such that a user could not remove the cover plate (and reinstall it) without it being evident upon a visual inspection that the system had been tampered with, i.e., the cover plate had been removed and reapplied. The damage to the cover plate would therefore provide an indication via visual inspection that retaining member 540 was accessed and nut 11 may have been adjusted, thereby adjusting a preload of the bearing. This indication of tampering (i.e., indication of damage to cover plate 650) allows a seller or manufacturer of wheel bearing systems, such as an OEM of vehicle or car parts, to provide a warranty on bearing systems utilizing the described cover plate since it would be evident upon visual inspection that a nut (e.g., nut 11) holding a wheel bearing may have been tampered with due to the condition of the cover plate. The cover member or cover plate 650 may be of a variety of shapes and sizes, but preferably covers at least a portion of a retaining member (e.g., retaining member 540).

Figure 7:
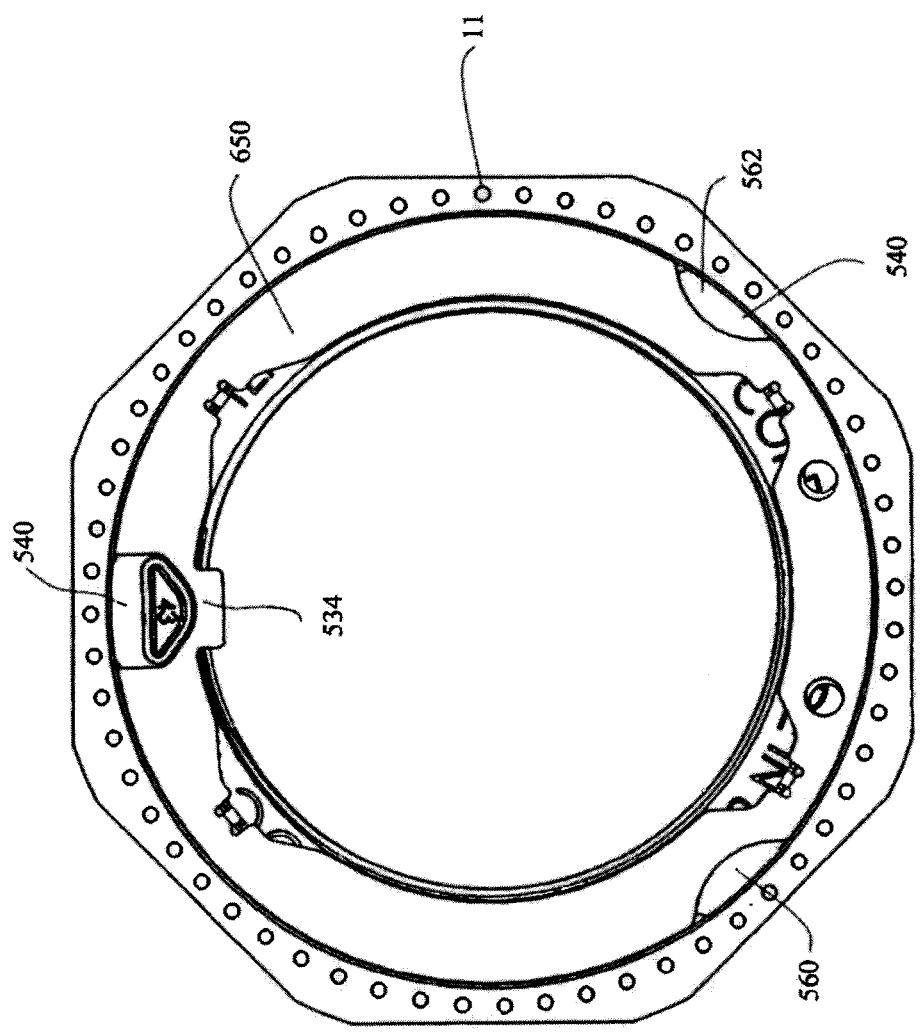
FIG. 7 depicts the lock nut system of FIG. 6 with tabs of the cover member rotated to inhibit separation of the cover member from the keeper retaining member.

Tabs 620 of cover plate 650 may be T-shaped having radial extending portions 652 and circumferential portions 654 connected thereto, as depicted in FIG. 6. Radial extending portions 652 may be connected to a remainder 656 of cover plate 650, and spaces 658 may separate radial extending portions 652 and circumferential portions 654 from remainder 656. Each of tabs 620 may be rotated toward nut 11 about one of points 659 connecting each of radial extending portions 652 to remainder 656. FIG. 7 depicts cover plate 650 and tabs 620 after the tabs are rotated about 90° toward nut 11.

Figure 8:
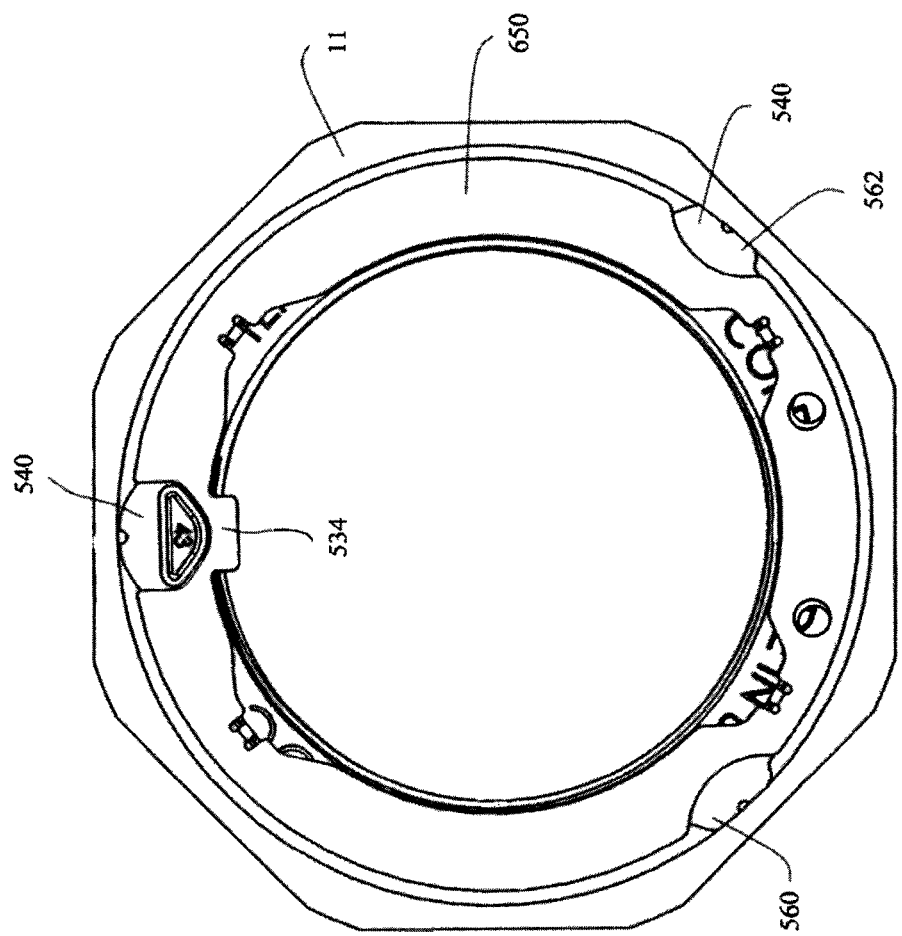
FIG. 8 depicts the lock nut system of FIG. 7 with a face of the nut removed for clarity.

Also, cover plate 650 may include indents 630 bounding openings 631 to allow a user to view retaining member 540 below cover plate 650 through opening 631 when the cover plate and retaining member are engaged to each other. For example, indents 630 may be located to allow the user to view protruding portions 560 and 562 when the cover plate and retaining member are installed on nut 11 to allow the user to confirm the proper installation of the retaining member on nut 11 without removing cover plate 650. For example, the user may view the location of groove 566, 567 relative to one or more markings 510 on outer surface 522 of nut 11 to corresponding to one or more roots engaging teeth 511 thereof as described in co-owned U.S. Pat. No. 8,316,530 issued on Nov. 27, 2012 titled "Systems And Methods For Preloading A Bearing And Aligning A Lock Nut", incorporated herein by reference. Further, keeper retaining member 540 may include a notch 541 in a nose 544 as described in the indicated co-owned patent. FIG. 8 depicts the system of FIG. 7 with a face portion of nut 11 removed, thereby showing the engagement of protruding portion 560 and protruding portion 562 with engaging teeth 511 of nut 11 and the engagement of keeper teeth 520 (FIG. 8) with the engaging teeth. Cover plate 650 may also include an indent 635 bounding opening 640 to allow a user to view notch 541 of nose 544 through opening 640 such that the user may view the engagement of keeper teeth 520 of the nose engaging teeth 511 of nut 11 and the alignment of notch 541 with one or more markings 510, as depicted for example in FIG. 6.

Figure 9:
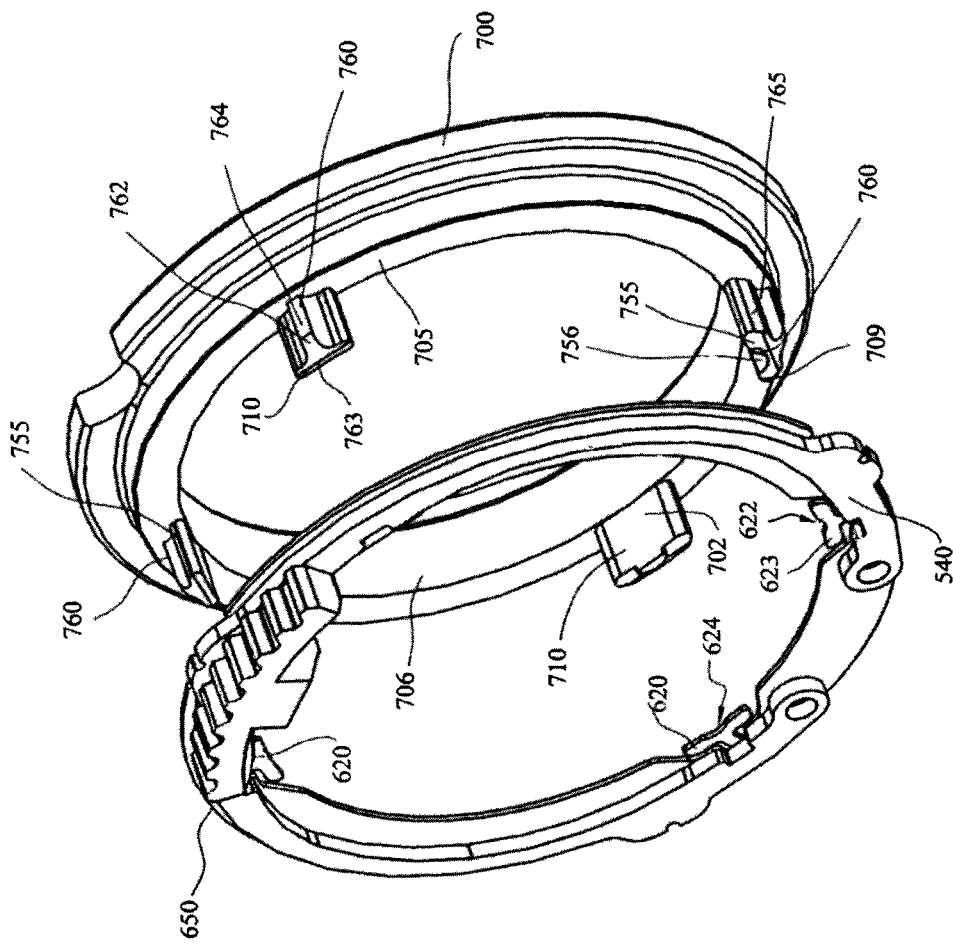
FIG. 9 depicts a rear angle perspective view of the lock nut system of FIG. 6 with the nut removed and a cover member insulation tool adjacent the cover member and keeper retaining member.
Figure 10:
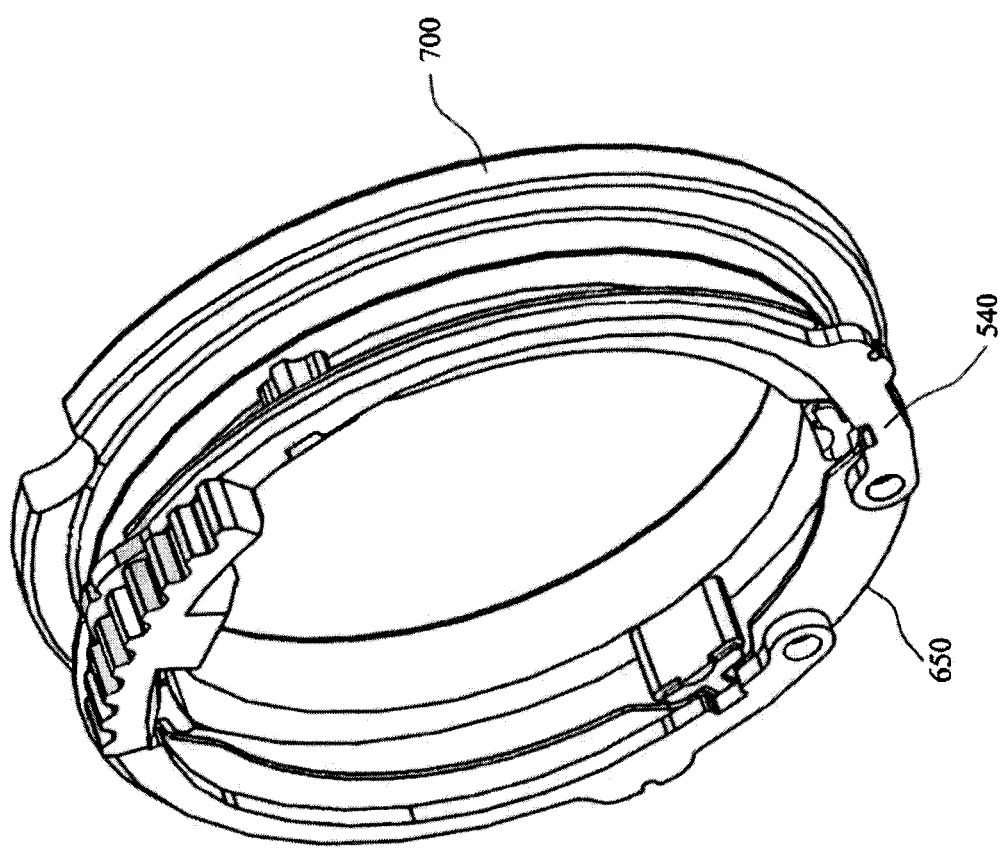
FIG. 10 depicts the keeper retaining member and cover member of FIG. 9 with the tool contacting tabs of the cover member.

FIG. 9 depicts an installation tool 700 adjacent cover plate 650 and retaining member 540 (omitting nut 11 for clarity) before tabs 620 (depicted in FIG. 6) are bent or deformed toward nut 11 as depicted in FIG. 7. As depicted in FIG. 10, legs 710 of installation tool 700 may be caused by a user to contact tabs 620 to bend or deform tabs 620 toward nut 11. For example, a user may align legs 710 with tabs 620 and push tool 700 through a cavity bounded by retaining member 540.

Legs 710 of installation tool 700 may be circumferentially spaced pressing members (e.g., four such members as depicted in the figures) extending axially from a circumferential base 705. Each leg 702 of legs 710 may include a circumferential portion 755 and a radial portion 760. The circumferential portion may be located on a radially innermost side of base 705 such that an innermost surface 706 of base 705 are at a same radial distance. Radial portion 760 may be located radially outwardly of the circumferential portion and may extend axially from base 705. A curved or arched surface 762 may connect an axially outermost surface 763 of circumferential portion 755 with a radially outermost surface 764 of radial portion 760.

Circumferential portion 755 may include a projection 756 extending axially from a remaining portion of the circumferential portion. Projection 756 may be configured (e.g., shaped and dimensioned) to be received in a recess 622 of a tab 623 of tabs 620 of cover plate 650 when circumferential portion 755 contacts tab 623 to deform the tab toward a retaining member (e.g., retaining member 540) and toward a nut (e.g., nut 11). As depicted, projection 756 may be rounded at least on a radial outer surface contacting tab 623 to be received in recess 622 which may also be rounded on a radial inner side. The engagement of tab 623 bounding recess 622 with tool 700 at the location of such engagement may promote an initial engagement and alignment of tool 700 with cover plate 650, for example.

Radial portion 760 may be configured (e.g., shaped and dimensioned) to be received in an opening 624 created in cover plate 650 and one of notches 600 when each leg 702 contacts tab 623 to deform the tab toward a retaining member (e.g., retaining member 540) and toward a nut (e.g., nut 11).

Figure 11:
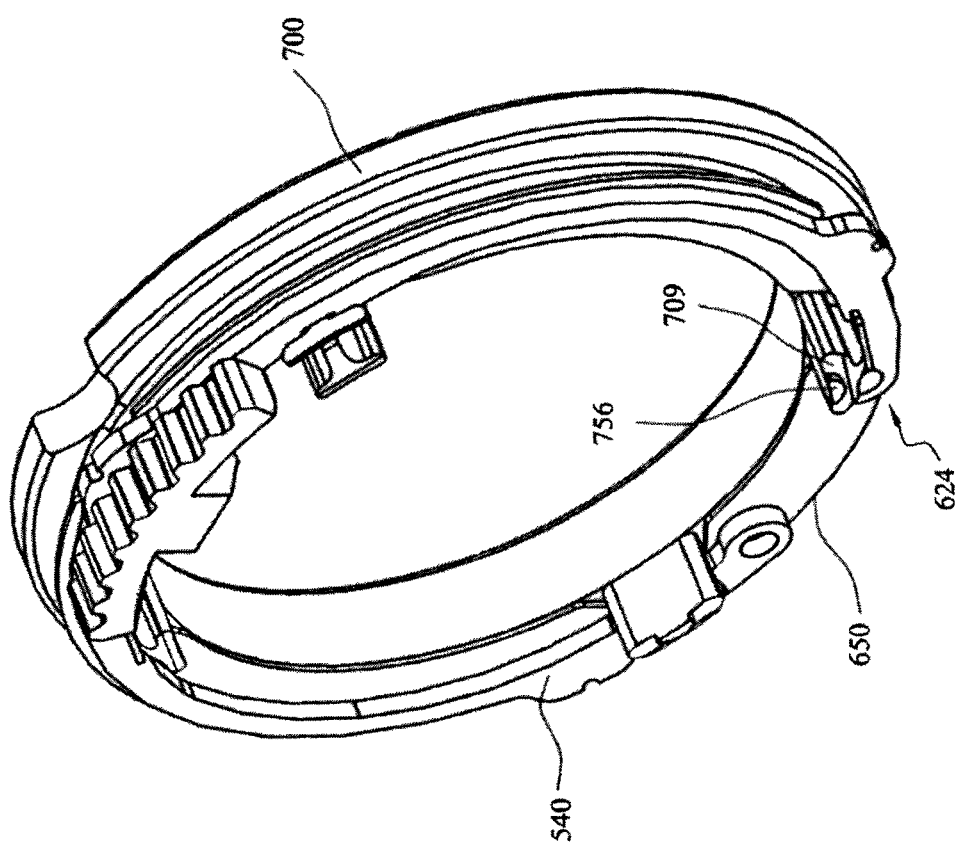
FIG. 11 depicts the system of FIG. 10 with the tool having legs extended into notches of the cover member and keeper retaining member to connect the cover member to the keeper retaining member.
Figure 12:
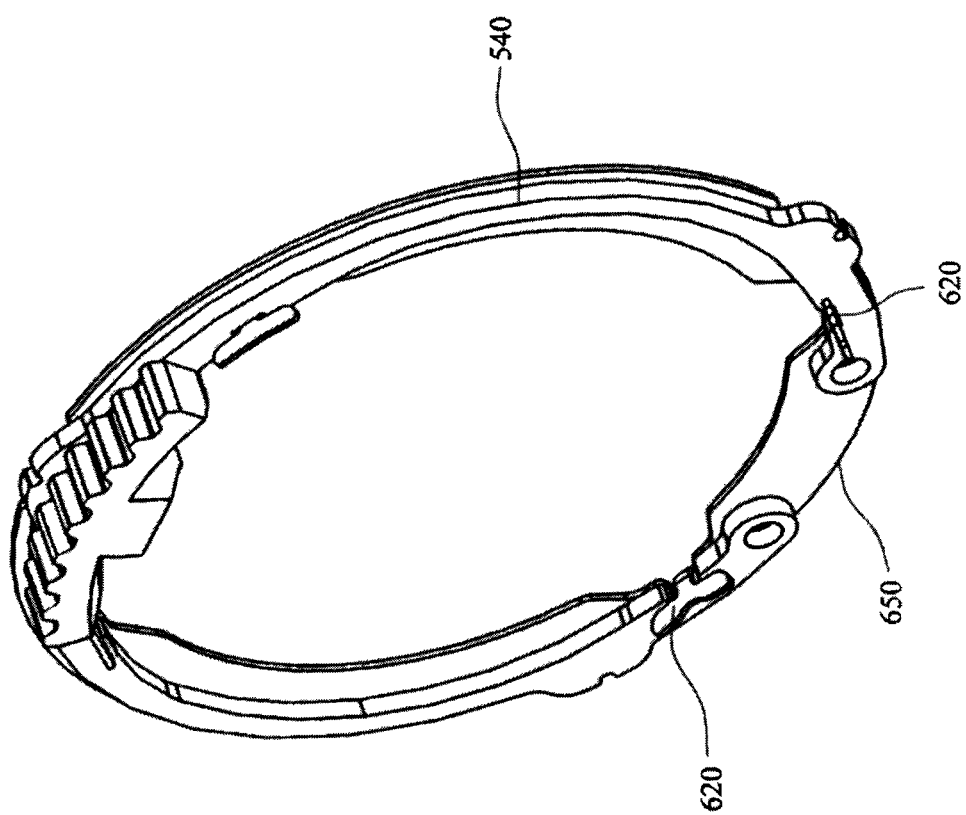
FIG. 12 depicts the keeper retaining member and cover member of FIG. 11 showing the tabs of the cover member rotated to the insert into slots of the keeper retaining member.
Figure 13:
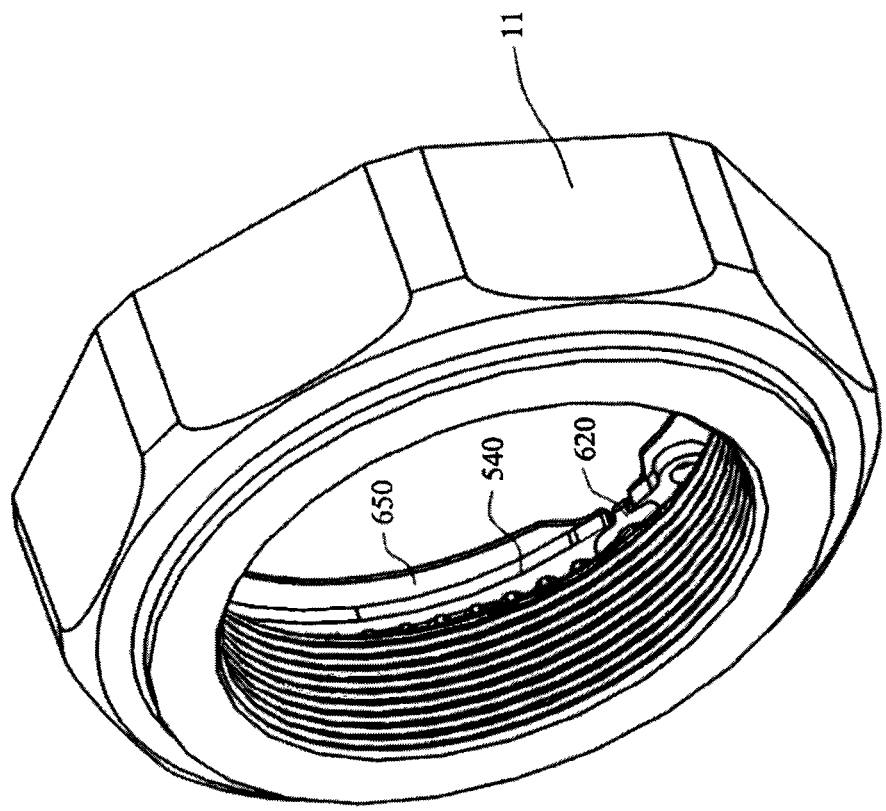
FIG. 13 depicts a perspective view of the lock nut system of FIG. 3 with the cover member attached to the keeper retaining member via tabs extended into notches of the keeper retaining member.

FIG. 11 depicts installation tool 700, retaining member 540 and cover plate 650 with ends 709 of legs 710 of the installation tool pushed axially past an outside axial surface of cover plate 650 and retaining member 540 after having bent tabs 620 about 90 degrees. FIG. 12 depicts the cover plate connected to the retaining member after removal of the installation tool, while FIG. 13 depicts cover plate 650 connected to retaining member 540, which is engaged in the groove of nut 11. As depicted in FIG. 12, radial extending portions 652 of cover plate 650 are received in notches 600 of retaining member 540 while circumferential extending portions 654 are located on an opposite side of retaining member 540 relative to remainder 656 of cover plate 650 such that opposite ends 671 of circumferential extending portions 654 extend circumferentially outside notches 600 thereby inhibiting movement of the tabs through the notches in a direction away from nut 11. More particularly, opposite ends 671 inhibit backward movement of cover plate (i.e., by contacting retaining member 540 on opposite sides of notches during any such backward movement) to inhibit separation of cover member 650 and retaining member 540, and thereby provide a visual indication of tampering when tabs 620, or another portion of cover plate 650, are damaged or deformed by the separation of the cover plate from the retaining member.

Figure 14:
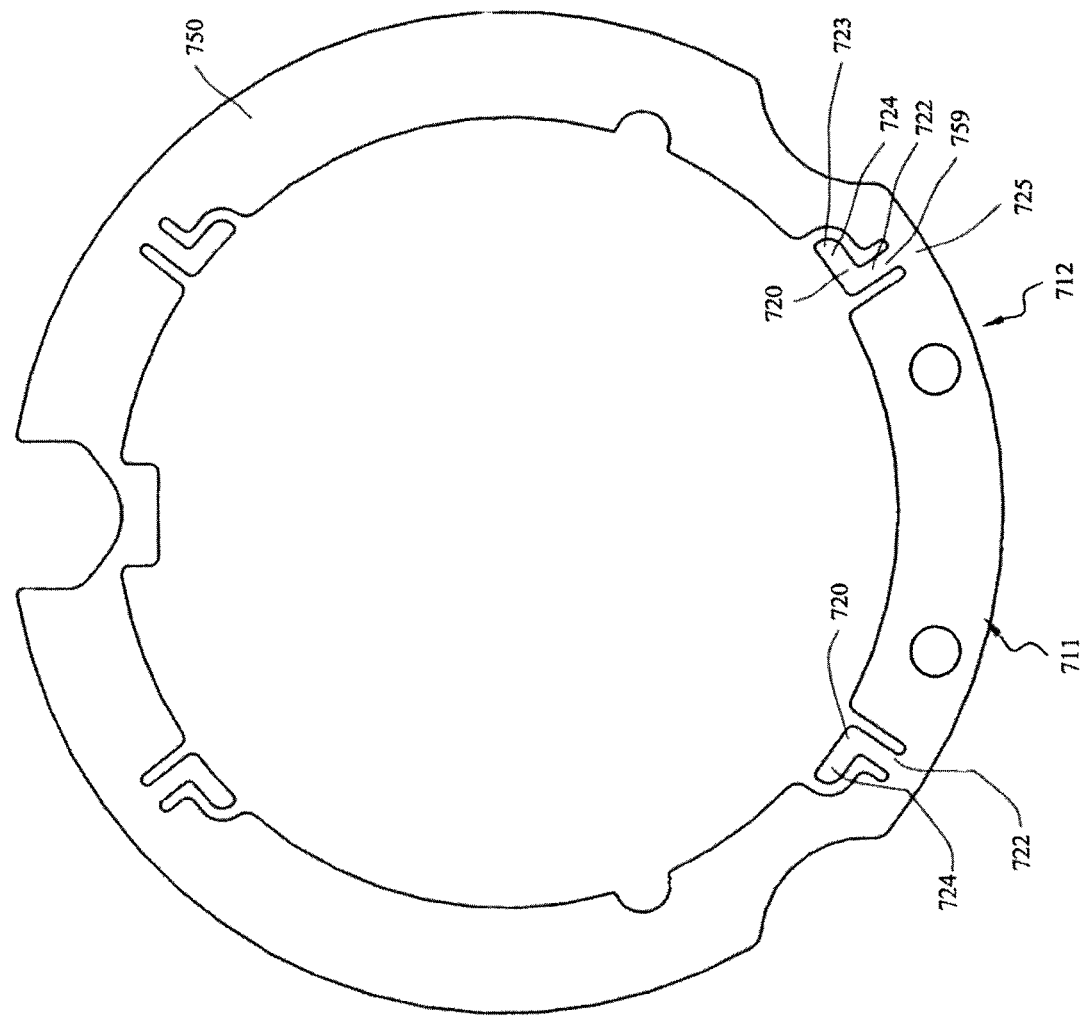
FIG. 14 depicts a front elevational view of another embodiment of a cover member usable with the retaining member, keeper and lock nut as depicted in FIG. 3.

In another example depicted in FIG. 14, a cover plate 750 is similar to cover plate 650 described above with the only relevant difference being that tabs 720, which are L-shaped, are substituted for T-shaped tabs 620. As described above relative to radial extending portions 652 and circumferentially extending portions 654, radial extending portion 722 may be received in notches 600 of retaining member 540 while circumferential extending portions 724 may be located on an opposite side of retaining member 540 relative to remainder 656 of cover plate 650 such that ends 723 of circumferential extending portions 724 extend circumferentially outside notches 600 thereby inhibiting movement of the tabs through the notches in a direction away from nut 11. As described above, the extension of the circumferential portion outside the notch may inhibit separation of the retaining member from the cover plate (i.e., due to contact of circumferential extending portions 724 with retaining member 540) thereby providing a visible indication when such separation is attempted, and tabs 720 are thereby deformed or damaged.

Figure 30:
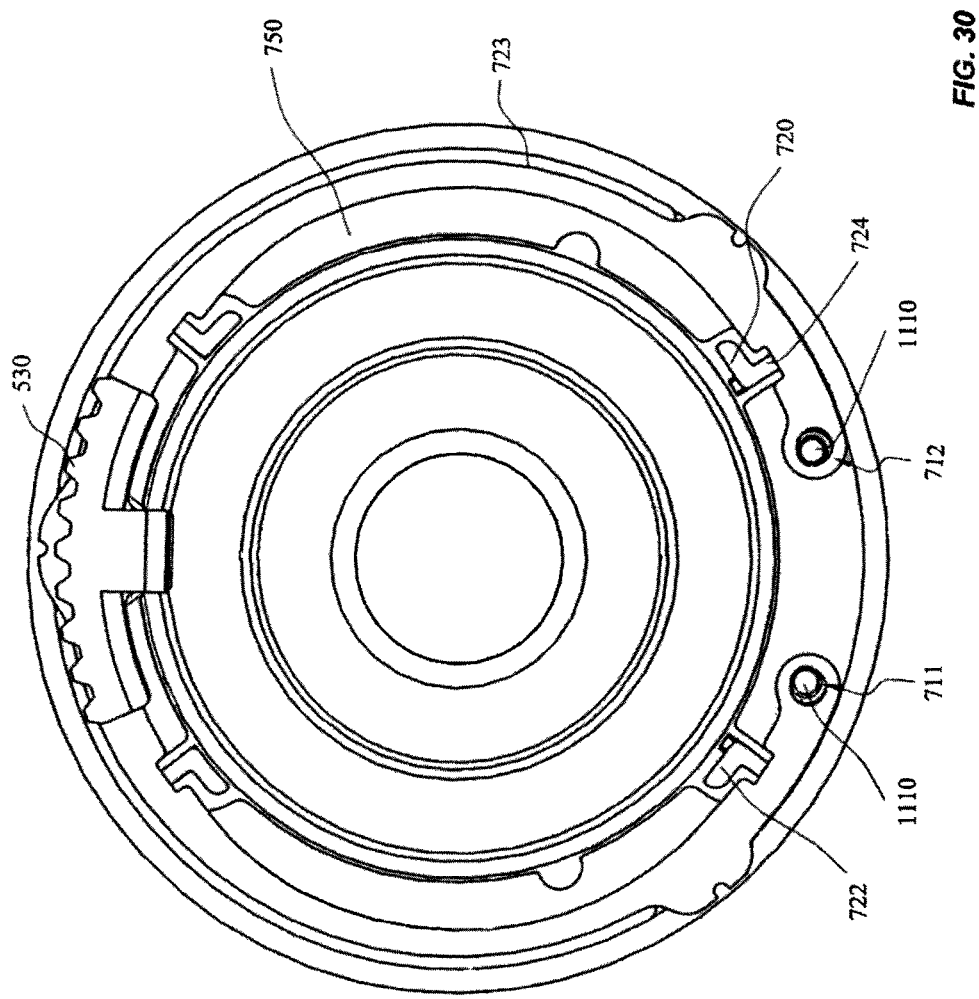
FIG. 30 depicts a bottom elevational view of the cover member of FIG. 14 between a retaining member and an installation tool.

FIGS. 31 and 32-34 depict an installation tool 1100 which may be used to engage cover plate 750 with retaining member 540 as described above relative to cover plate 650. FIG. 30 depicts an underside of retaining member 540 and cover plate 750 engaged with installation tool 1100 with nut 11 not shown for the purpose of clarity. Cover plate 750 may include openings 711 and 712 axially aligned with openings 611 and 612. Tool 1100 may include posts 1110 configured (e.g., spaced, dimensioned and shaped) to extend through openings 711 and 712 and openings 611 and 612 as depicted.

Figure 31:
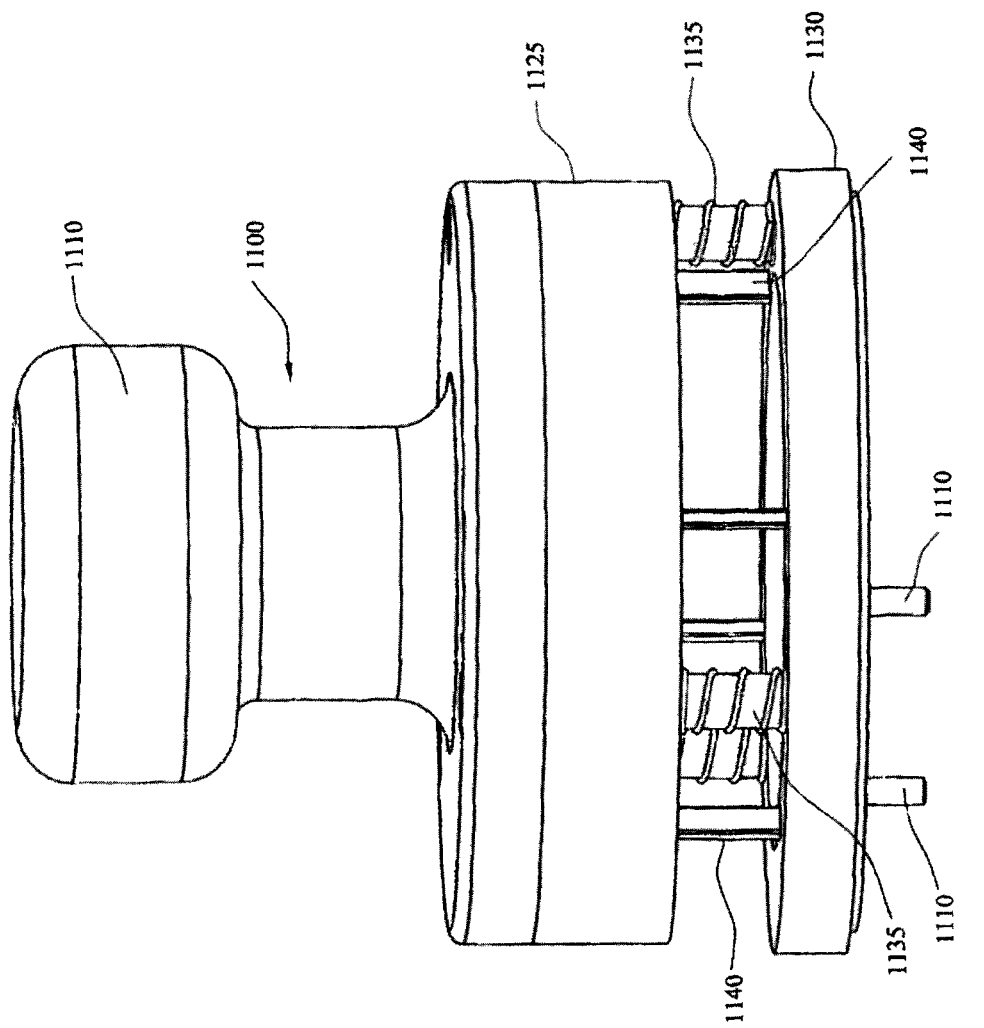
FIG. 31 depicts a side elevational view of the installation tool of FIG. 30.
Figure 32:
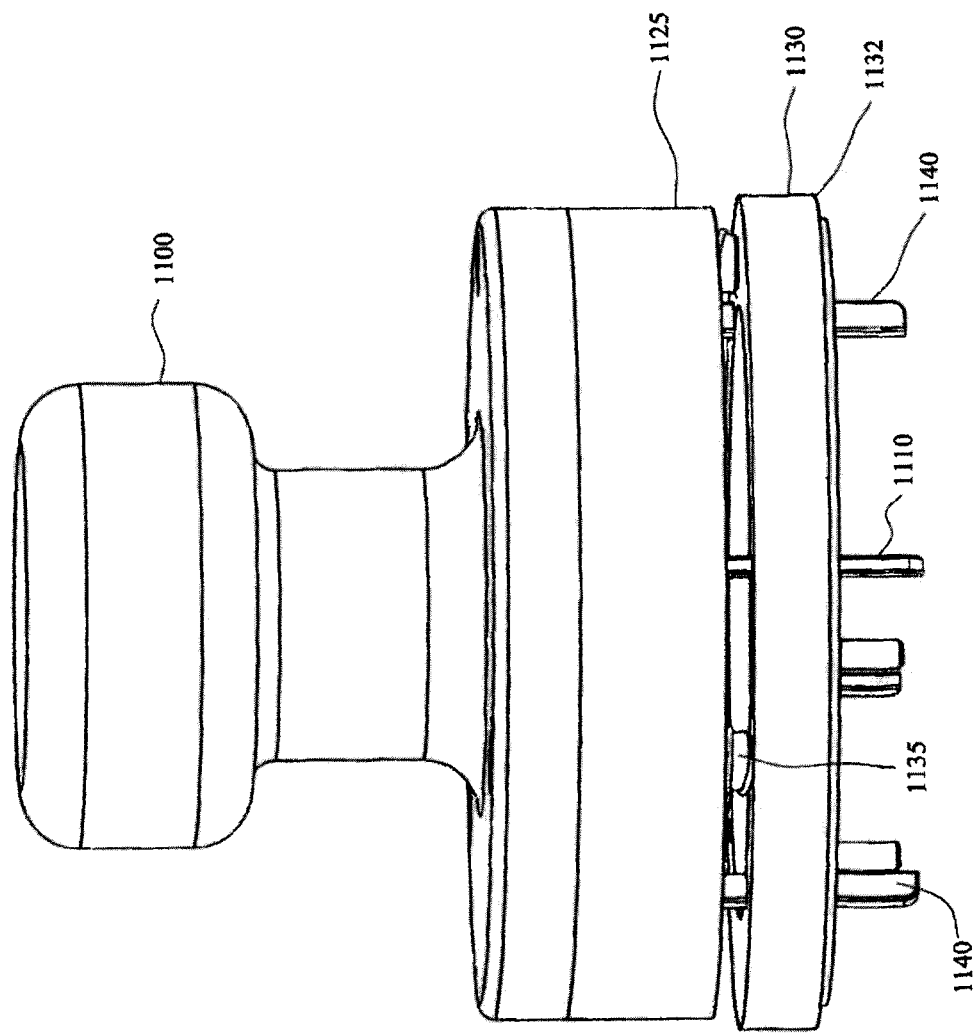
FIG. 32 depicts a side elevational view of the installation tool of FIG. 31 with an end member thereof partially retracted toward a body of the installation tool.

As depicted in FIG. 31, tool 1100 may include a handle 1110, a main body 1125, and an end contacting member 1130. Resilient members 1135 (e.g., springs) may be circumferentially spaced at various locations around and between main body 1125 and end contacting member 1130. Legs 1140 may be connected to main body 1125 and may be configured (e.g., located, dimensioned and aligned) to extend through openings in end contacting member 1130. Legs 1140 may be circumferentially spaced (e.g., at equal intervals) at various locations around main body 1125 and connected thereto. FIG. 32 depicts tool 1100 with end contacting member 1130 partially retracted toward main body 1125, resilient members 1135 compressed and legs 1140 extended through end contacting member 1130 as if end pressing contacting 1130 abutted a stationary object (e.g., cover plate 750 on top of retaining member 540 engaged to nut 11) and pressure were applied toward such object using handle 1110. End contacting member 1130 may be ring or washer shaped, and main body portion 1125 may have a cylindrical shape, as depicted in the figures, for example.

Figure 33:
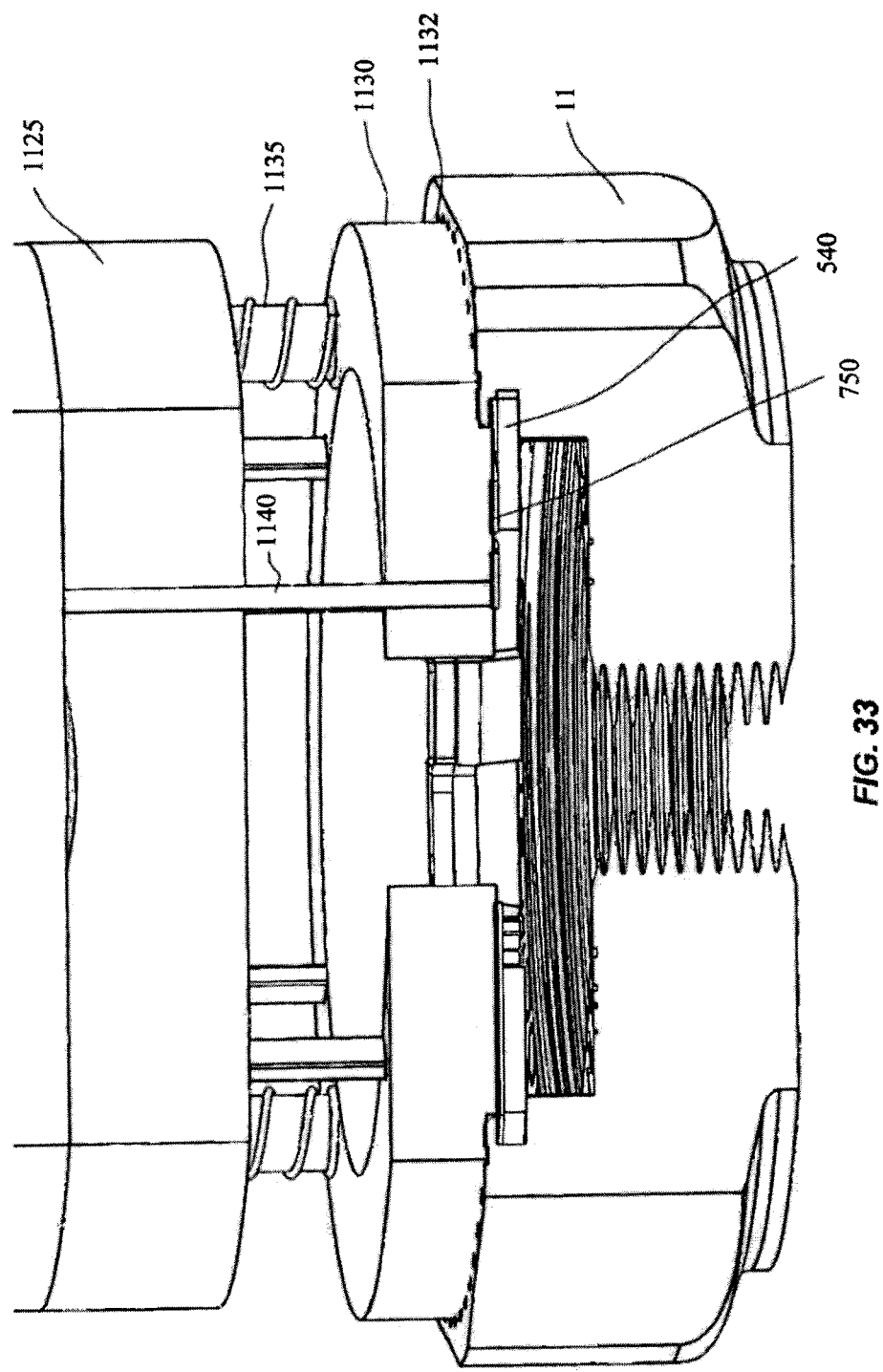
FIG. 33 is a side partial cross-sectional view of a portion of the installation tool of FIG. 32.
Figure 34:
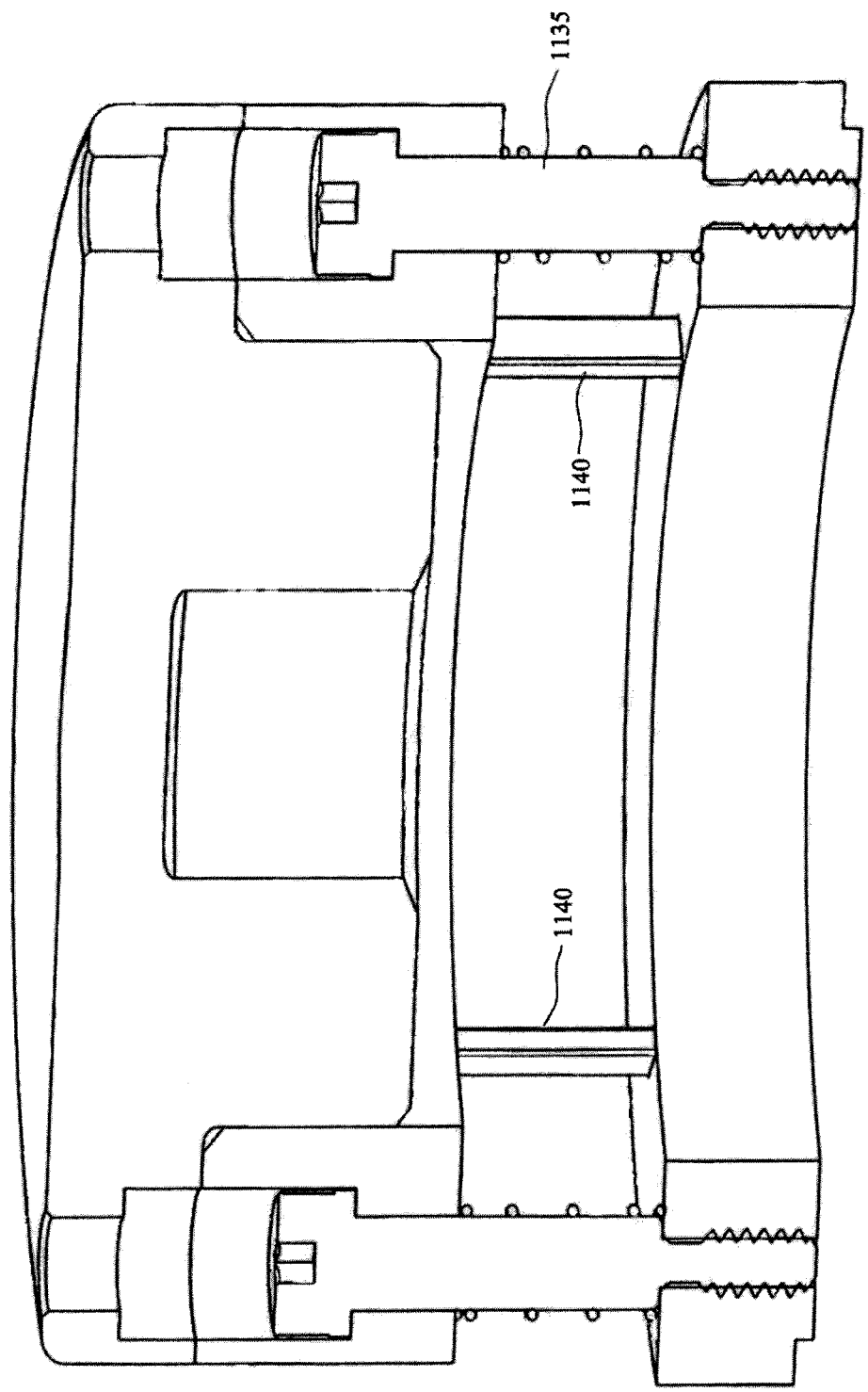
FIG. 34 is another side partial cross-sectional view of a portion of the installation tool of FIG. 32.

FIG. 33 depicts tool 1100 on top of and engaged with cover plate 750 and retaining member 540. Retaining member 540 is engaged to nut 11 as described above while posts 1110 are received in openings 611, 612 and openings 711, 712. Nut 11 is depicted partially cut away along a line parallel to an axis of nut 11 and tool 750 to reveal interior details of nut 11 and tool 1100 including cover plate 750 between retaining member 540 and tool 1100. Legs 1140 are not extended in this figure relative to end contacting member 1130 and instead are in a position similar to that depicted in FIG. 31. From the depiction in FIG. 33, pressure may be applied to handle 1110 to result in the position depicted in FIG. 32 with the addition of legs 1140 contacting tabs 720 to deform each tab of tabs 720 toward a retaining member (e.g., retaining member 540) and toward a nut (e.g., nut 11). As described, legs 1140 ((e.g., four such legs as depicted)) may be spaced about and connected to a remainder of tool 1100 such that legs 1140 are located to contact tabs 720 when posts 1135 are received in openings 611, 612 and 711, 712. Pressure on handle 1110 may cause legs to contact tabs 720 such that each of tabs 720 may be rotated toward nut 11 about one of points 759 connecting each of radial extending portions 722 to a remainder 725 of cover plate 750. As indicated above, such deformation may cause radial extending portions 722 to be received in notches 600 while ends 723 of circumferential extending portions 724 extend circumferentially outside notches 600 on an opposite side of cover plate 750 relative to tool 1100 such that a separation of cover plate 750 from retaining member 540 would be inhibited. Any such separation would cause a deformation or damage to cover plate 750 that would be evident upon a visual inspection of cover plate 750 even if an attempt was made to reattach cover plate 750 to retaining member 540.

In one example, legs 1140 may be shaped as described above for legs 710 except that ends thereof may be configured to engage tabs 720 instead of tabs 620. For example, ends of legs 1140 opposite main body 1125 may include a circumferential portion and a radial portion shaped and dimensioned to engage tabs 720 such that the ends may engage and deform such tabs toward retaining member 540 and nut 11.

Figure 35:
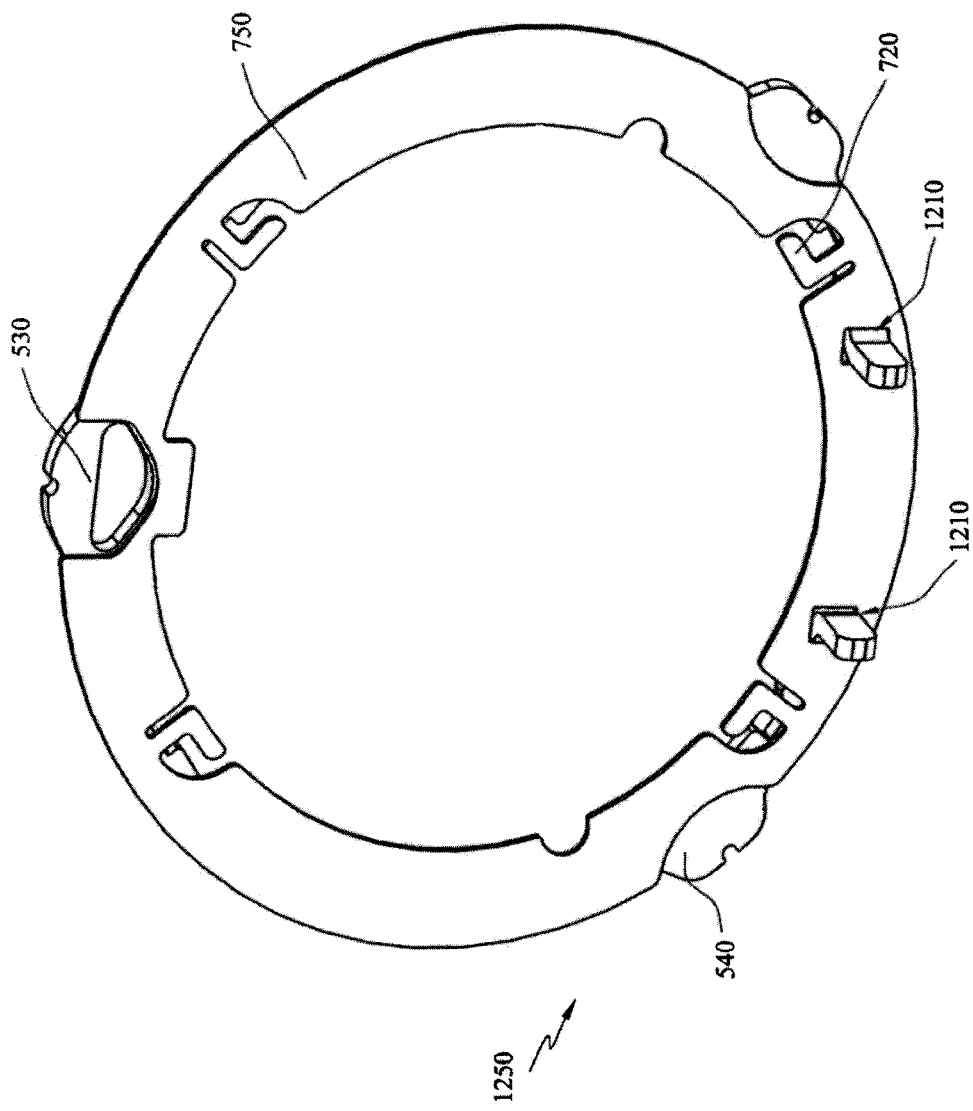
FIG. 35 is a perspective view of another embodiment of a cover member engaging a retaining member in accordance with an aspect of the present invention.

In another example depicted in FIG. 35, a cover plate 1250 may be identical to cover plate 750 except for openings 1210 configured (e.g., located, shaped, and dimensioned) to allow gripping members of a retaining member to pass therethrough. For example, such a retaining member could be a retaining member 540 having gripping members 568 and 569, as disclosed in U.S. Pat. No. 8,650,757 entitled Methods for Preloading a Bearing and Aligning a Lock Nut", incorporated herein by reference. Tool 1100 may also be used to install cover plate 1250 as described above. Some of the features of cover plate 1250 are indicated on FIG. 35 with the same reference numerals as those described above for cover plate 750 with other reference numerals omitted and any features not specifically pointed out being the same as those described above relative to cover plate 750 and depicted on the appropriate figures. The remaining features of cover plate 1250 are identical to those of cover plate 750 as indicated.

In other examples, cover plates (e.g., cover plate 650, cover plate 750 and 1200) could include tabs formed in any shape which inhibits separation of the cover plate from the retaining member and provides a visual indication when such separation is attempted. Further a tool (e.g., tool 700 and tool 1110) could include any number of legs or pressing members configured to deform tabs of a cover plate to inhibit separation of the cover plate from a corresponding retaining member and provides a visual indication when such separation is attempted and/or has occurred. Moreover, the features of the cover plates (e.g., cover plate 650, cover plate 750 and 1200) described, such as tabs (e.g., tabs 620, tabs 720) openings (e.g., opening 631, opening 640, opening 624, opening 711 and opening 712), could be located in different positions relative to each other such the features correspond to appropriate features of a retaining member to facilitate engagement of the cover plates and retaining members and to inhibit separation of one from another. Further, the features of the cover plates and retaining members may be located to facilitate engagement of an installation tool (e.g., tool 700 or tool 1100) to one and/or the other. Similarly, features of an installation tool (e.g., tool 700 or tool 1100) may be located to align such features (e.g., legs 710, legs 1140) with appropriate features (e.g., tabs 620, tabs 720, openings 711 and 712 and openings 611 and 612) of a cover plate and/or retaining member.

Figure 15:
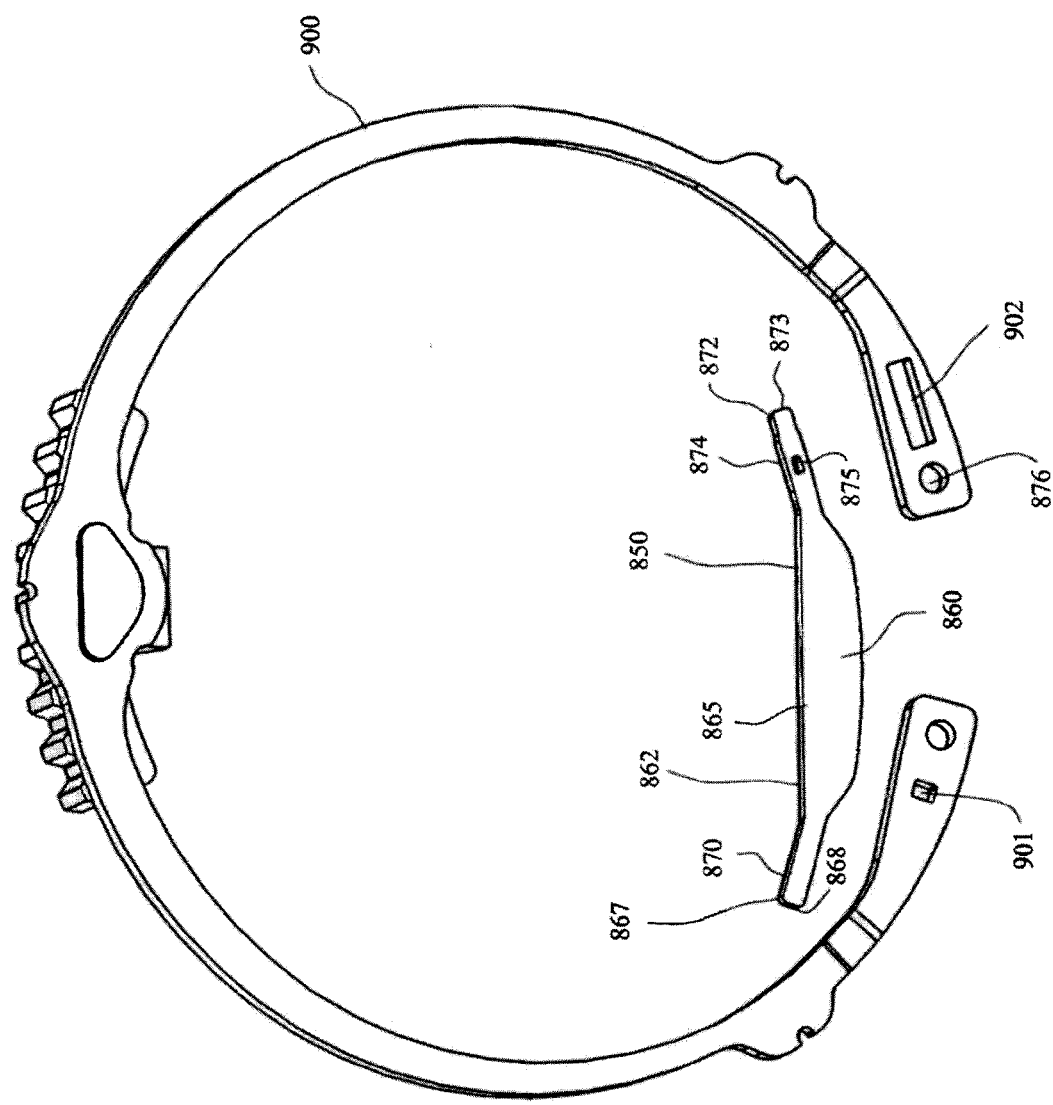
FIG. 15 depicts a front perspective view of a retaining member and a locking member separate from one another.

In a further example depicted in FIGS. 15-18, a locking member 850 may substitute for cover plate 650 and cover plate 750 described above while a retaining member 900 may substitute for retaining member 540. FIG. 15 depicts retaining member 900 adjacent locking member 850 wherein locking member 850 is substantially linear in a longitudinal direction and includes a curved bottom 860. A central portion 862 includes a top central linear side 865. A left portion 867 includes a left outer upper side 870 and a right portion 872 includes a right outer upper side 874 which has an opening 875.

Retaining member 900 may be identical to retaining member 540 except for an absence of notches 600 in retaining member 900 and an addition of a left opening 901 and a right opening 902 in retaining member 900 which are not present in retaining member 540. The above description relative to retaining member 540 applies relative to retaining member 900 except for these distinctions.

Figure 16:
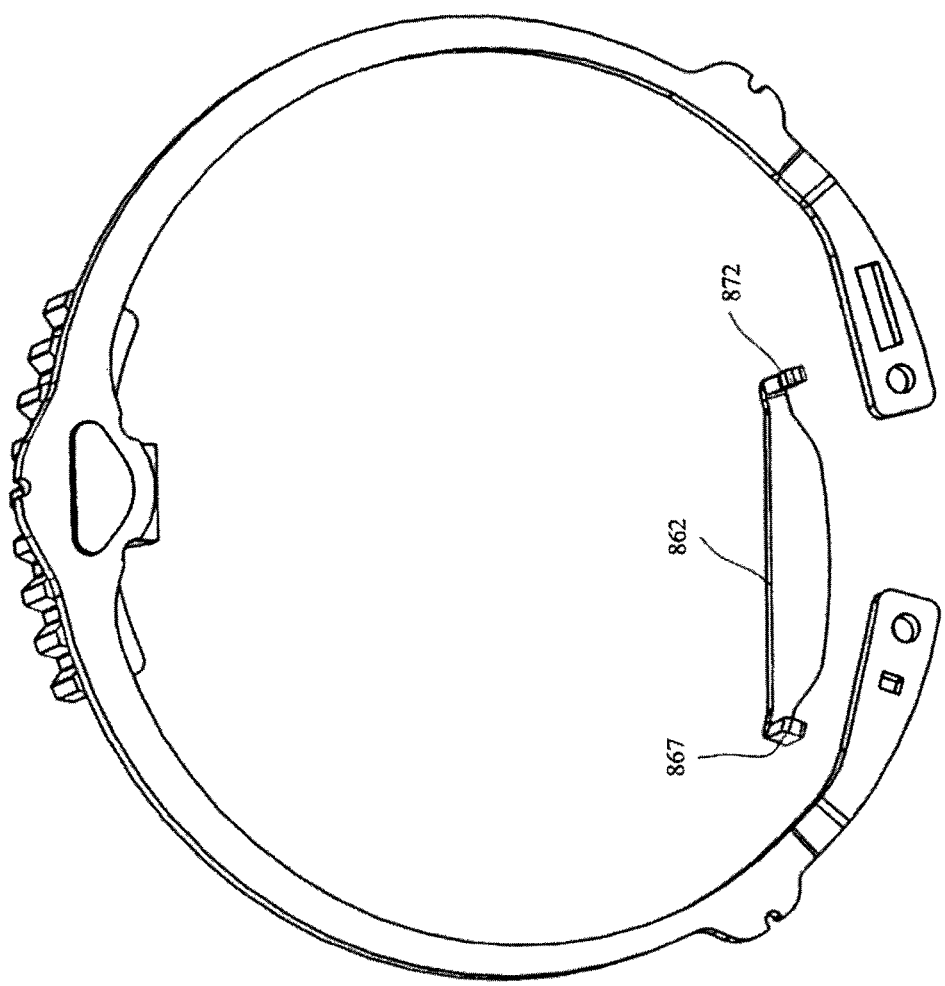
FIG. 16 depicts the retaining member and locking member of FIG. 15 with ends of the locking member deformed.
Figure 17:
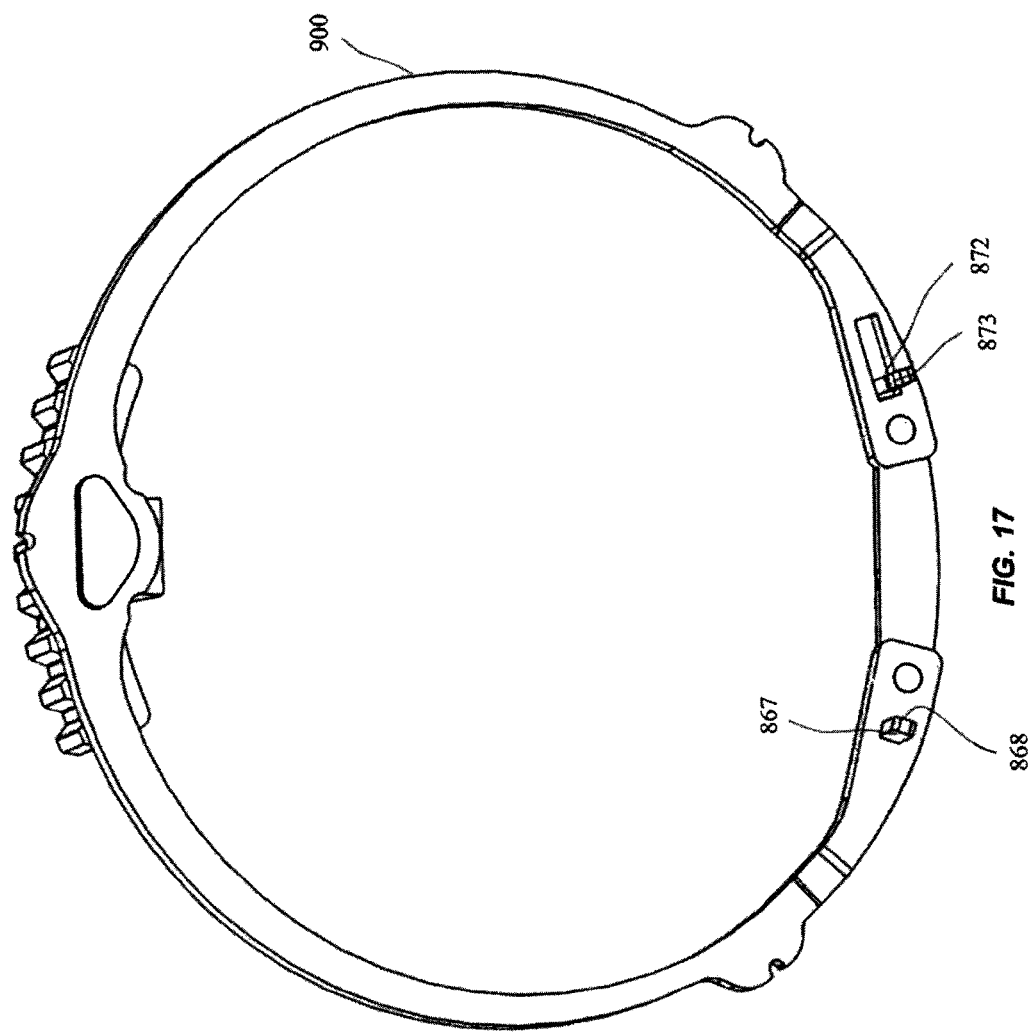
FIG. 17 depicts the retaining member and locking member of FIG. 16 with the locking member engaged to the retaining member.

As depicted in FIG. 16, left portion 867 and right portion 872 may be bent toward one another and relative to central portion 862 (about a connecting point between the central portion and the right and left portions), such that linear dimensions of the left and right portions are about perpendicular to a longitudinal dimension of central portion 862. As depicted in FIG. 17, left portion 867 may be inserted into left opening 901 of retaining member 900 while right portion 872 may be inserted in right opening 902.

Figure 18:
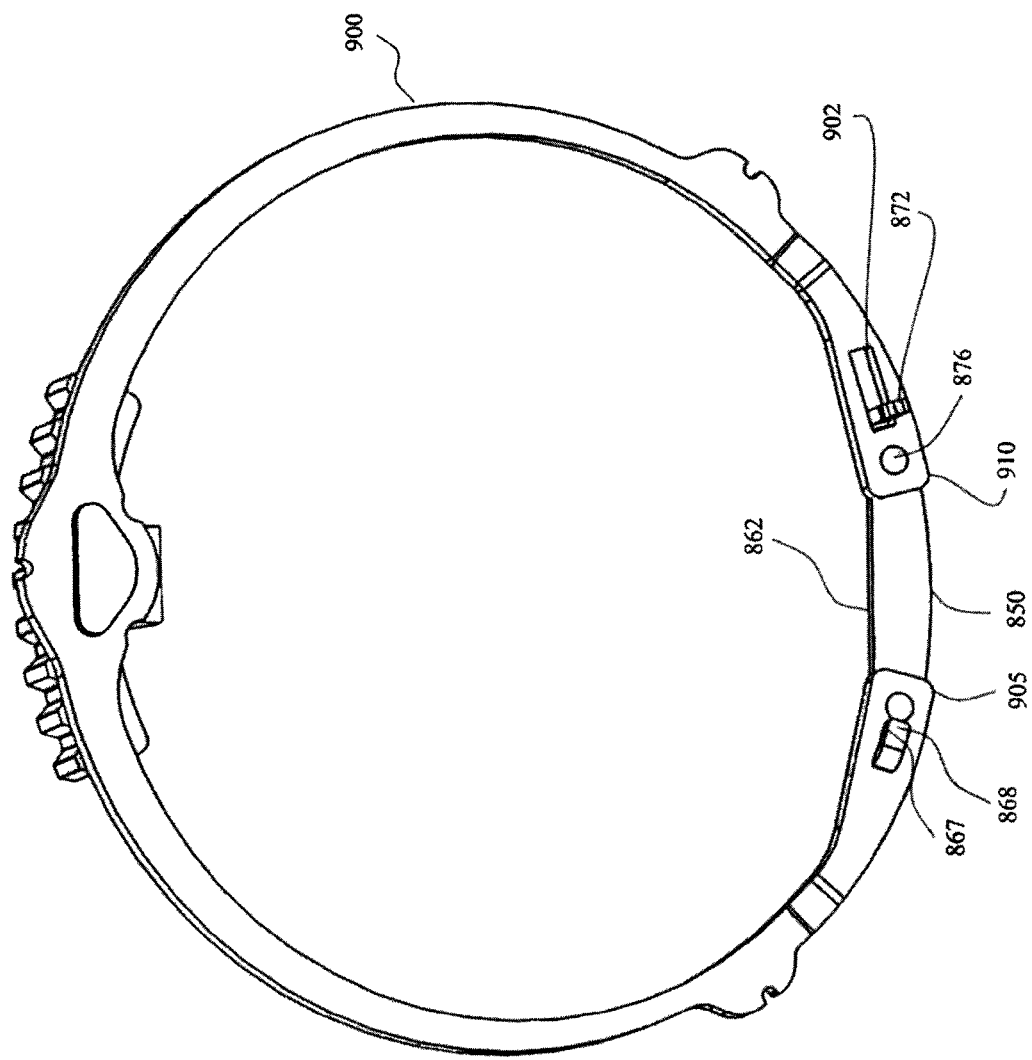
FIG. 18 depicts the locking member and the retaining member of FIG. 17 with and end of the locking member deformed to connect to the retaining member.
Figure 19:
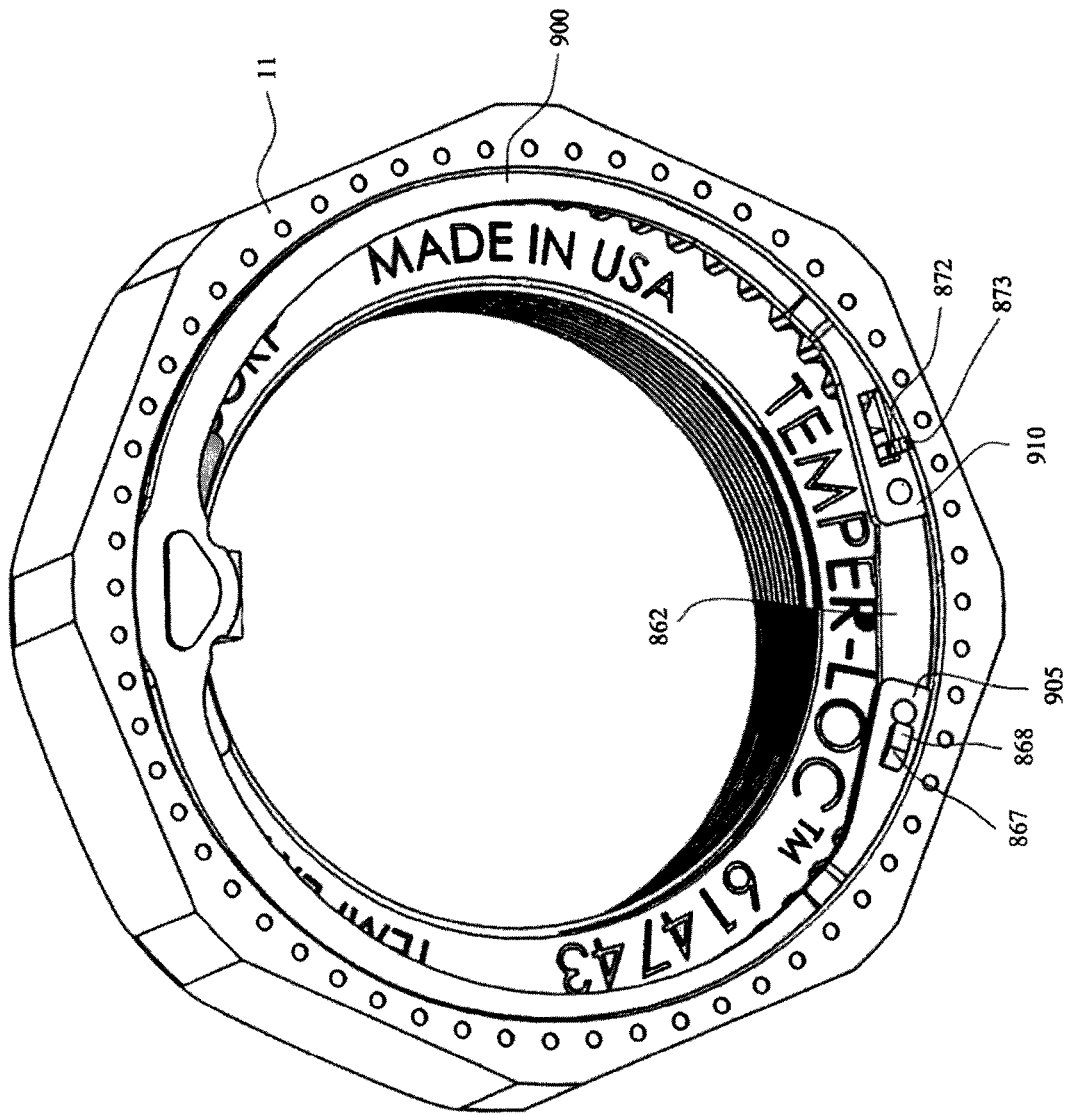
FIG. 19 depicts the retaining member and locking member of FIG. 18 engaged to a locking nut.
Figure 20:
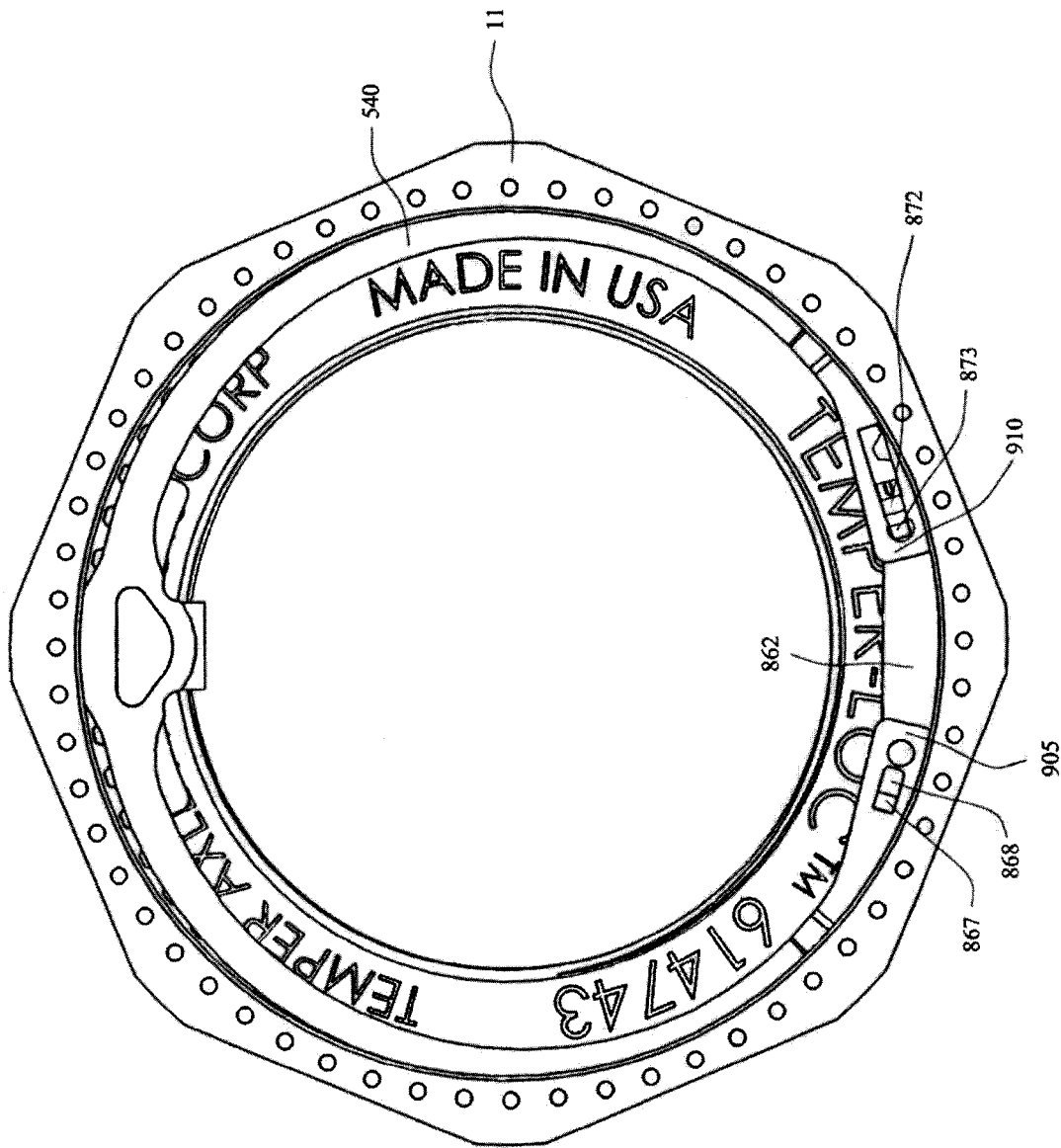
FIG. 20 depicts a front perspective view of a retaining member and locking member engaged to a locking nut depicted in FIG. 19.

Retaining member 900 may have ends 905 and 910, similar to ends 610 of retaining member 540 described above. Left portion 867 may be bent further such that an end 868 of left portion 867 moves toward end 910 and left portion 867 has a longitudinal dimension substantially parallel to central portion 862 as depicted in FIG. 18. Retaining member 900 may then be engaged with nut 11 as depicted in FIG. 19. As depicted in FIG. 20, right portion 872 may be bent, or otherwise deformed, such that an end 873 moves toward end 905 of retaining member 900 and right portion 872 has a longitudinal dimension substantially parallel to longitudinal dimensions of left portion 867 and central portion 862. Right portion 872 may also be bent such that end 873 is located in an opening 876 in retaining member 900.

The bending or deformation of right portion 872 therefore connects ends 905 and 910 of retaining member 900 to each other such that locking member 850 and/or retaining member 900 would be damaged or deformed if one attempted to remove retaining member 900 from nut 11. Further, the removal of end 873 from opening 876 would be evident if one attempted to remove retaining member 900. As noted above, the visual indication provided by any such damage provides a tampering indicator, which allows an original equipment manufacturer to provide warranties for wheels which have endplay adjusted to a particular specification prior to the installation of retaining member 900 and locking member 850. In particular, the indicator lets the OEM know upon inspection the retaining member-locking member assembly has been tampered with thereby violating any warranty which prohibits such tampering.

The deformation described above relative to locking member 850 to attach the locking member to the retaining member could be performed using standard pliers (e.g., needle nose pliers) or a tool designed to specifically provide for the bending of the portions of locking member 850 described above.

Figure 21:
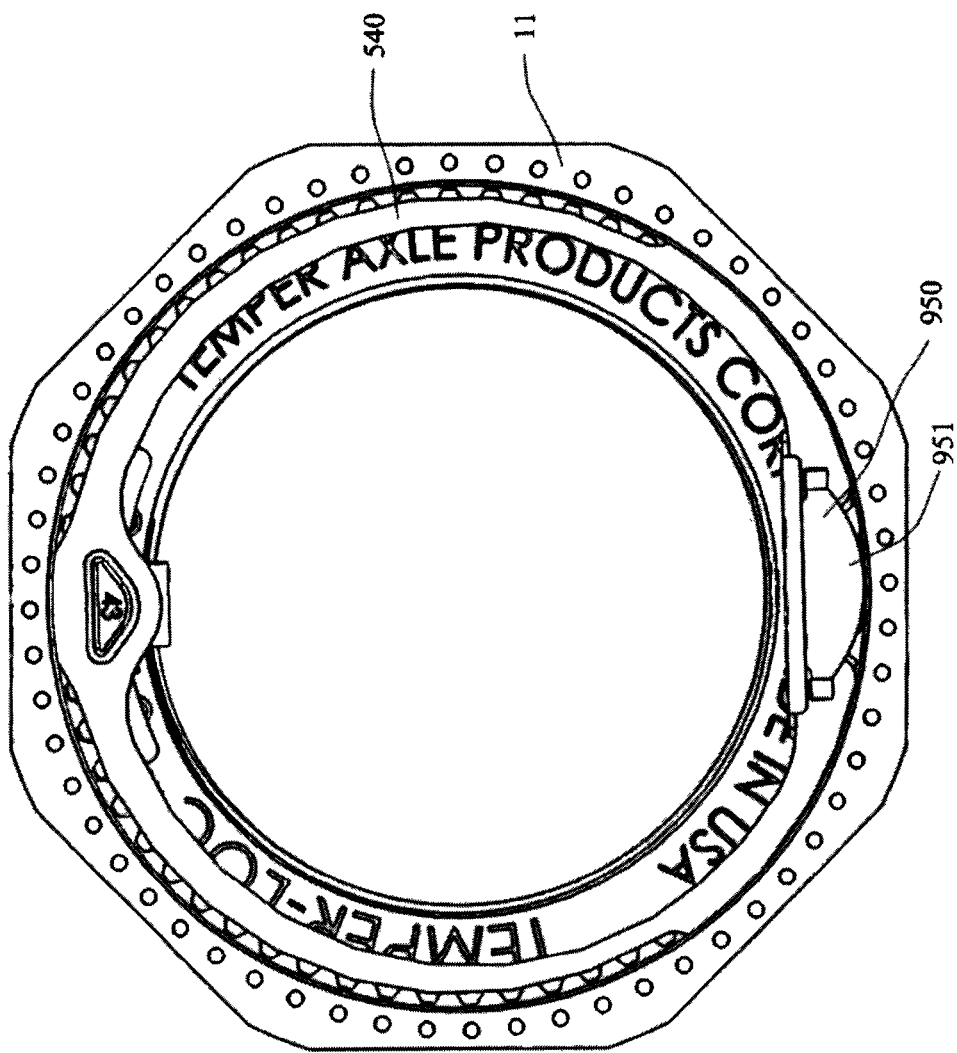
FIG. 21 is a front elevational view of a lock nut system having a retaining member engaged to a locking member with the retaining member engaged to a lock nut in accordance with an aspect of the present invention.

In another example depicted in FIG. 21, retaining member 540 may be engaged with a locking member 950 such that any separation of one from the other to allow retaining member 540 to be disengaged from nut 11 would provide a visual indication of tampering as described above relative to retaining member 540 and retaining member 900.

Figure 22:
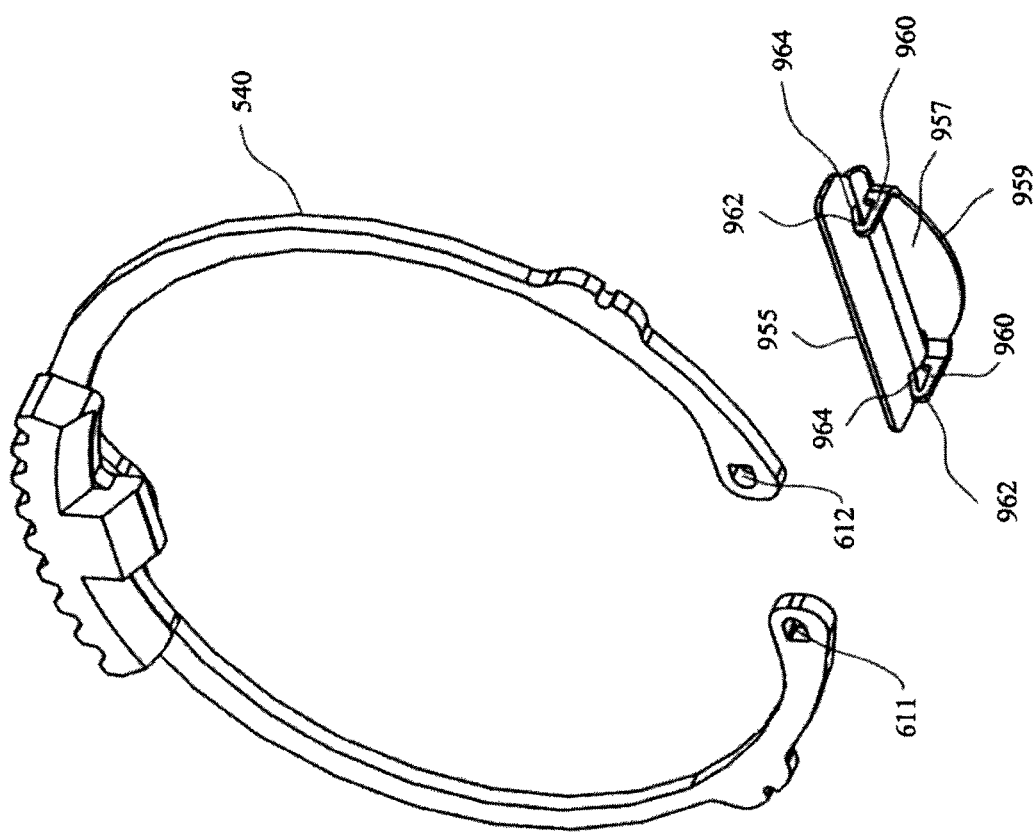
FIG. 22 depicts an exploded perspective view of the retaining member and locking member of FIG. 21.
Figure 23:
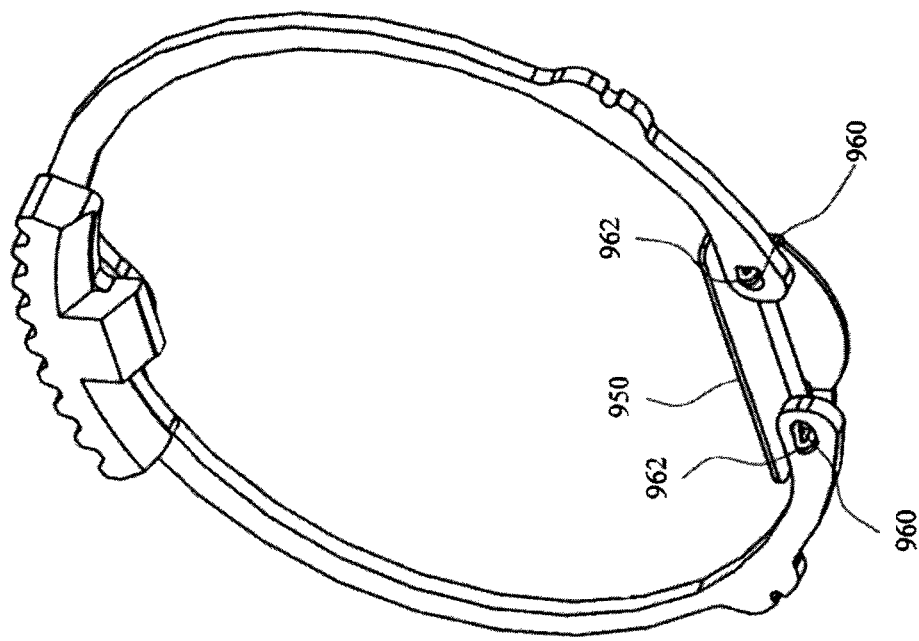
FIG. 23 is a perspective view of the retaining member and locking member of FIG. 22 connected to one another.
Figure 24:
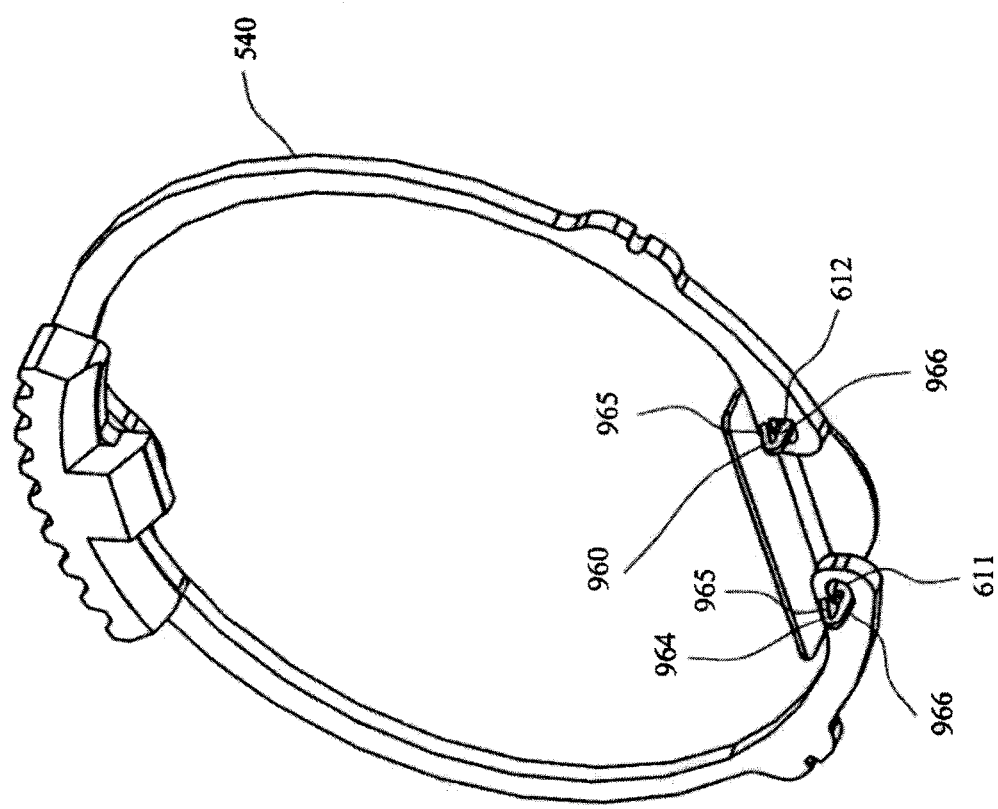
FIG. 24 depicts the retaining member and locking member of FIG. 23 with tabs of the locking member extended through openings in the retaining member.

FIG. 22 depicts retaining member 540 separated from locking member 950. Locking member 950 may include a flat top plate 955 and a vertical portion 957 having a curved bottom 959. Tabs 960 may extend outwardly from vertical portion 957 and may be substantially perpendicular to vertical portion 957 and may be substantially parallel to a width dimension of flat top plate 955. Tabs 960 may include curved portions 962 connected to backwardly extending portions 964. FIG. 23 depicts tabs 960 extending through openings 611 and 612 of retaining member 540 with only curved portions 962 on an opposite side of retaining member 540 relative to a remainder of locking member 950. FIG. 24 depicts backwardly extending portions 964 on an opposite side of retaining member 540 relative to remainder of locking member 950 in a "locking" position. Backwardly extending portions 964 have ends 965 which may be deformed toward horizontal portions 966 of tabs 960 when tabs 960 are inserted through openings 611 and 612 and are forced together by portions of the retaining member bounding these openings. Locking member 950 including tabs 950 may be formed of a material (e.g., spring steel) such that after ends 965 emerge from the openings on an opposite side of retaining member 540, and the ends elastically return away from horizontal portions 966, such that the ends are therefore located vertically above a top extent of openings 612 and 611 (i.e., in the "locking" position). Accordingly, any attempt to retract tabs 960 through openings 611 612 would result in a contact of backwardly extending portions 964 with a backside of retaining member 540. Such contact between tabs 960 and retaining member 540 would inhibit separation of one from another. Further, any attempt to retract the tabs through the openings would result in damage or deformation to the tabs which would be evident to a user upon visual inspection.

Returning to FIG. 21, locking member 950 may include a front side 951 on which a user may apply a force to cause tabs 962 to extend through openings 611 and 612 such that tabs 960 deform inside the openings as described above and tabs 960 elastically return on an opposite side such that ends 965 of backwardly extending portions 964 are located above an upper extent of the openings to inhibit separation of retaining member 540 from locking member 950.

Figure 25:
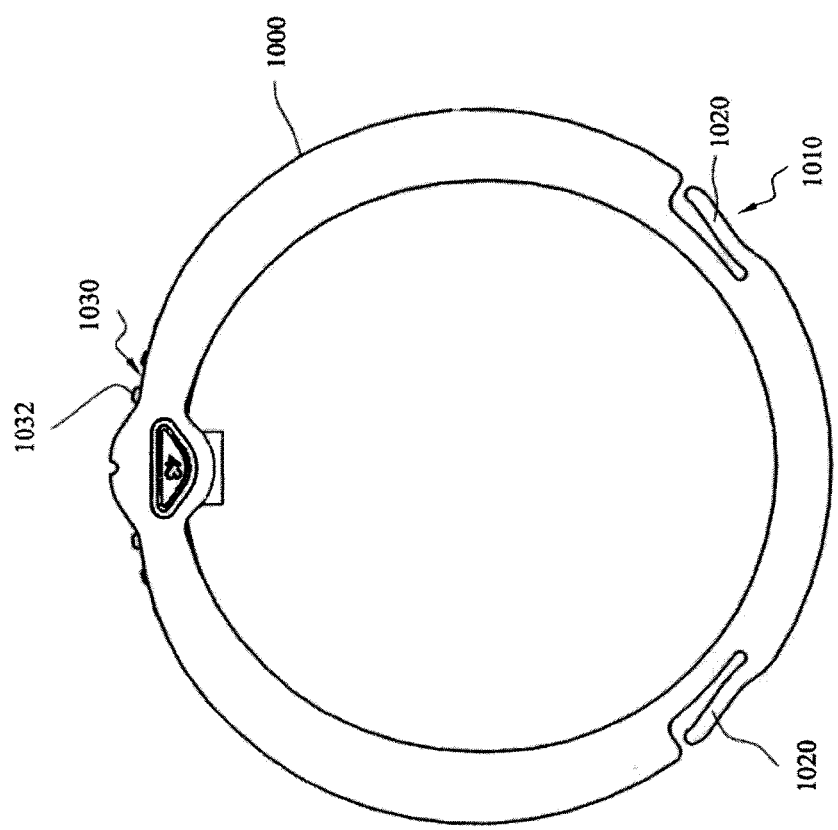
FIG. 25 is a front elevational view of a retaining view of a retaining member having an integral locking mechanism in accordance with an aspect of the present invention.

In another example depicted in FIG. 25, a keeper retaining member 1000 may include an integral locking mechanism 1010 having deformable legs 1020 along with a keeper 1030 connected to retaining member 1000. Keeper 1030 may be identical to keeper 535 described above, and may be connected to keeper retaining member 1000 in the same way as described above relative to keeper 538 and keeper retaining member 540.

Figure 26:
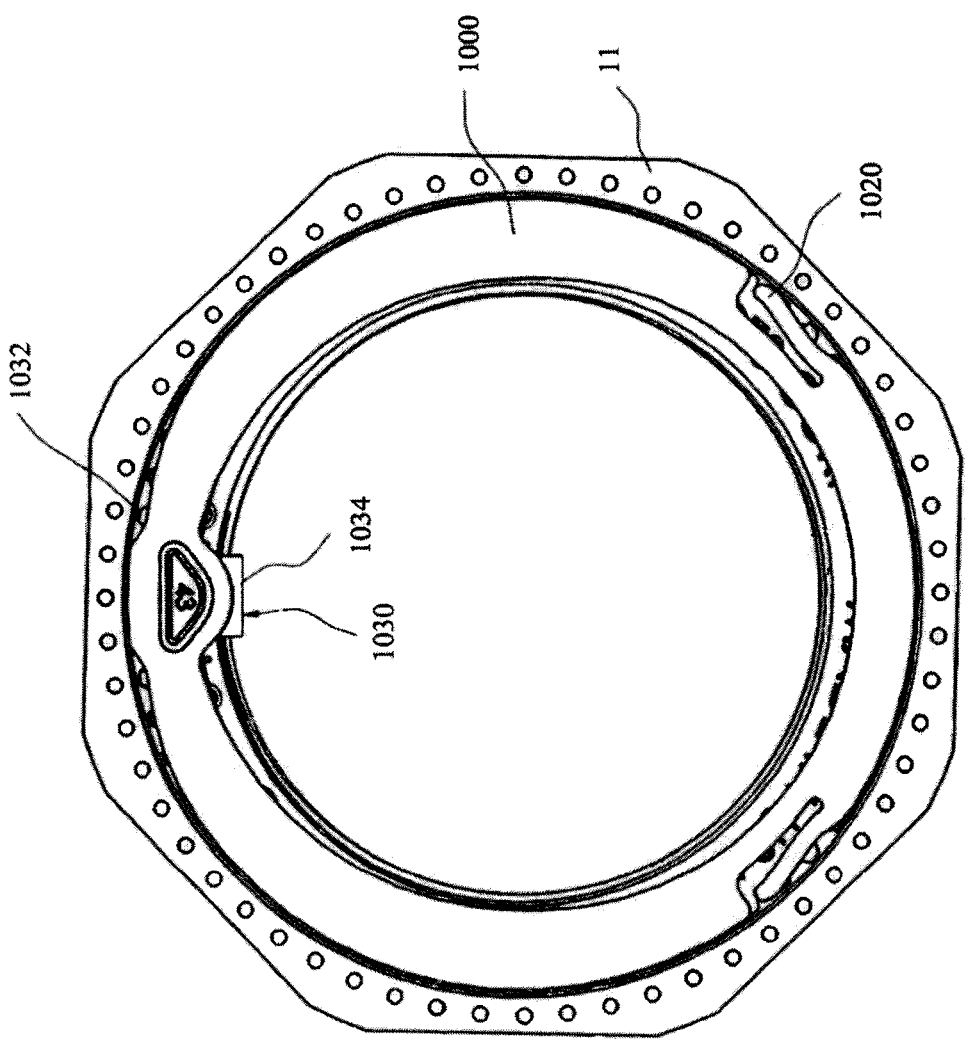
FIG. 26 depicts the retaining member of FIG. 25 engaged with a lock nut.
Figure 27:
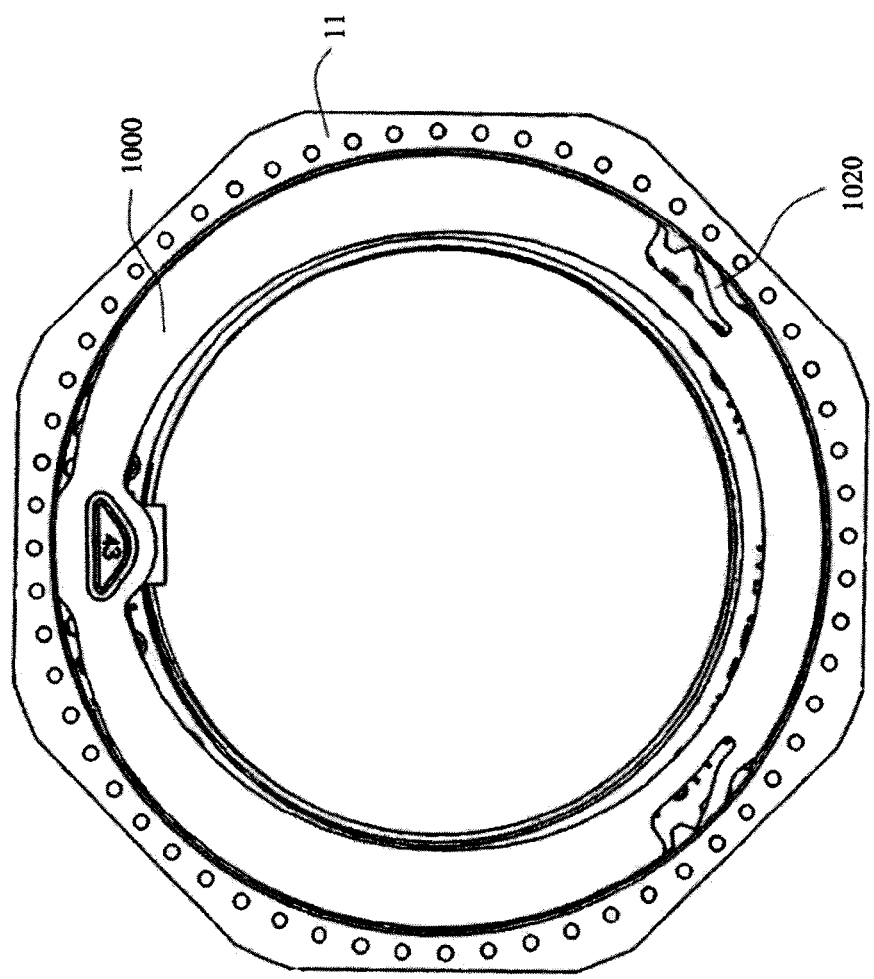
FIG. 27 depicts the retaining member and lock nut of FIG. 26 with legs of the retaining member engaged with teeth of the lock nut.
Figure 28:
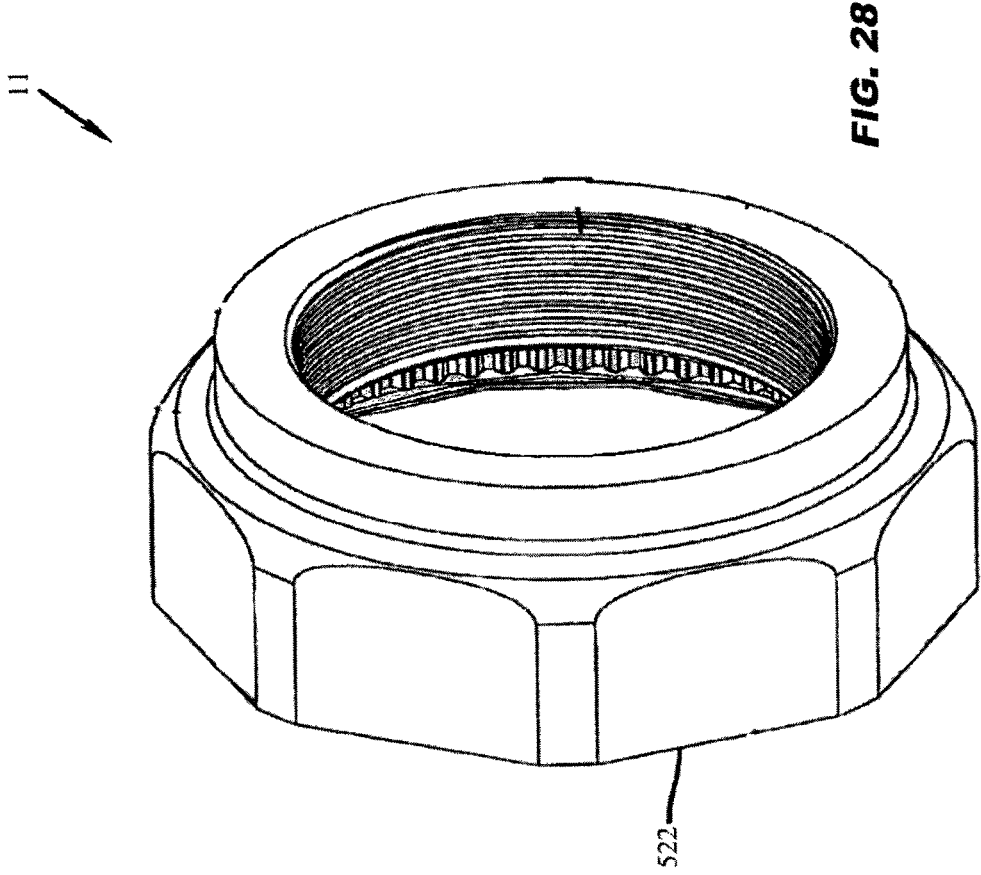
FIG. 28 is a perspective view of a retaining nut in accordance with an aspect of the present invention.
Figure 29:
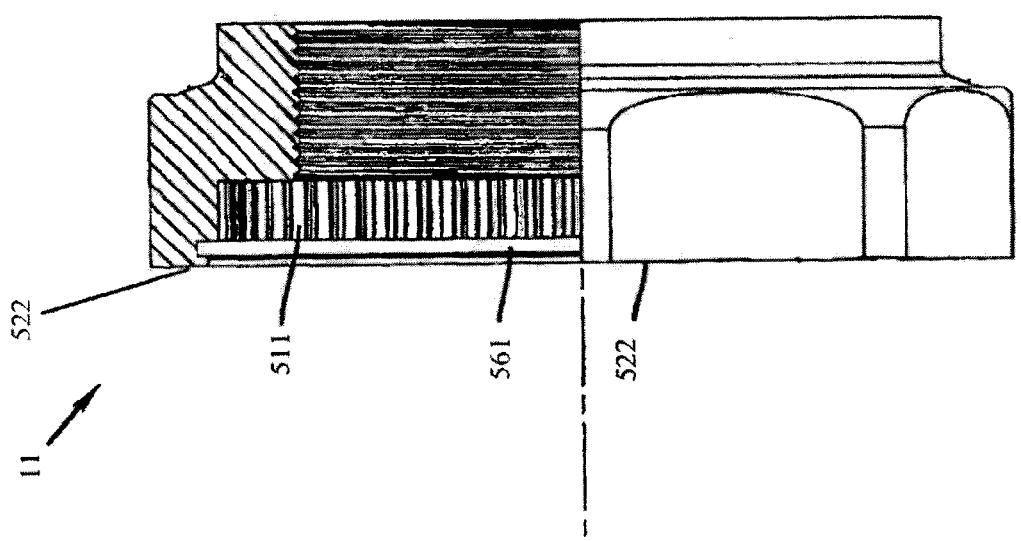
FIG. 29 is a side partial cross-sectional view of the retaining nut of FIG. 28.

As depicted in FIG. 26, retaining member 1000 may engage nut 11 such that keeper teeth 1032 of keeper 1030 engage engaging teeth 511 of retaining nut 11. Keeper 1030 may also include an engaging member 1034 which protrudes radially inwardly relative to retaining nut 11 to engage a shaft slot (e.g., shaft slot 5 in FIG. 2), keyway, groove or other engaging portion of a shaft (e.g., spindle 14). Once retaining member 1030 is located in a desired position relative to nut 11, legs 1020 may be deformed radially outwardly (FIG. 27) to engage slot 561 of retaining nut 11, for example, engaging teeth 511 thereof. Any attempt to retract legs 1020 to allow retaining member 1000 to be removed from nut 11 would be evident upon a visual inspection due to an obvious deformation of legs 1020 and/or a remainder of retaining member 1000. As indicated above, the visual indication of the deformation provides an indication of tampering with a predetermined endplay applied to a bearing via nut 11, such that an original equipment manufacturer could provide a warranty to an originally applied endplay which would be voided upon an indication of tampering of the wheel bearing system, in particular, the endplay thereof.

For example, the retaining members described above (e.g., retaining member 540, retaining member 900, and retaining member 1000) may be formed of stamped sheet metal, and may have a thickness in a range between 0.040-0.050 inches, as will be understood by those skilled in the art. Alternatively, the retaining members could be formed of other materials (e.g., powdered metal) and/or formed in other shapes to allow the retaining members to be received in slot 561 and to be connected to a keeper (e.g., keeper 540, keeper 1030) via a projection (e.g., projection 535). Further, the keepers may be formed or molded of powdered metal, for example. Alternatively, the keepers and retaining members could be formed integral or monolithic relative to one another.

The cover plates (e.g., cover plate 600 and cover plate 750) and other locking members (e.g., locking member 850 and locking member 950) may be formed of stainless steel. Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on outer surface 522 of nut 11 may be hardened, for example, induction hardened.

Returning to FIGS. 1-2, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment nut 48 which may be threaded to rod 40 (e.g., on external threads 41 (FIG. 1)) to mount press mechanism 44 to rod 40 and may provide a compressive load to press mechanism 44. Nut 48 may be adapted to facilitate rotation of nut 48, for example, nut 48 may include arms 50 and/or a hand wheel 51 that can assist a mechanic while manually tightening or untightening nut 48. In one aspect, nut 48 may be adapted to be rotated by an automated tool, for example, a drill or stepper motor (not shown). For example, nut 48 may be fashioned with a hex head or threads to engage an automated tool, for example, a torque motor (not shown).

As shown in FIGS. 1-2, press mechanism 44 includes a loading adapter 210. A compressive load from press mechanism 44 (e.g., from nut 48 thereof) is transmitted to bearing 16, and to bearing 18, by loading adapter 210. Further, loading adapter 210 works in conjunction with retaining nut 11 to provide a load to outboard bearing 16 (e.g., an inner race (not shown) thereof). Retaining nut 11 may have a recess that exposes the surface of inner race 15 and permits contact by, for example, loading adapter 210. For example, nut 11 may have a bottom curve or recessed portion 111 such that a bottom end of nut 11 has a smaller diameter than the remainder thereof. Loading adapter 210 may thus transmit the compressive load from press mechanism 44 (i.e., around nut 11) to bearing 16. In an unillustrated example, bearing 16 could be exposed thereby allowing load adapter 210 to be used with a conventional axle nut, as shown for example in FIG. 3 of co-owned application, U.S. Pat. No. 7,389,579 issued Jun. 24, 2008 (application Ser. No. 11/354,513, filed Feb. 15, 2006), and entitled "Method, Apparatus, And Nut For Preloading A Bearing". However, when bearing 16 would be concealed by such a conventional axle nut, retaining nut 11 may be used instead thereof according to aspects of the invention.

As depicted in FIGS. 10-11 of indicated co-owned U.S. Pat. No. 8,316,530, loading adapter 210 includes a plate 211 and at least two extensions, fingers, or arms 212, 213 extending from plate 211. In this aspect of the invention, extensions 212 and 213 are adapted to transmit the load applied to plate 211, for example, by the compression of nut 48, to the bearing 16. Plate 211 typically includes a through hole or bore 214 that is adapted to receive rod 40. Plate 211 may also include a raised boss 215 adapted to contact press mechanism 44, for example, adapted to contact piston 54 or bearing 64 (FIG. 3). In one aspect, extensions 212 and 213 may be moveable or deflectable to facilitate assembly of adapter 210 into engagement with bearing 16. For example, extensions 212 and 213 may include any interface with plate 211 or modification to extensions 212 and 213 that permits extensions 212 and 213 to deflect to avoid interference with nut 11. Extensions 212 and 213 may be pivotally mounted to plate 211. Plate 211 may include two pairs of oppositely extending lugs or projections 216 having through holes 219, and projections 216 may include recesses 218 configured (e.g., shaped and dimensioned) to receive extensions 212 and 213. Pins 222 may be provided in holes 219 in projections 216 that engage holes (not shown) in extensions 212 and 213 whereby extensions 212, 213 may rotate about pins 222.

As further illustrated in the indicated co-owned patent, arms or extensions 212, 213 may include projections 225, 226, respectively, for example, arcuate projections adapted to engage the arcuate shape of bearing 16 (e.g., an inner race thereof). Loading adapter 210 may also include an aligning arm 205 configured (e.g., shaped and dimensioned) to engage shaft slot 5 (FIG. 3) of spindle 14, for example, as depicted in FIGS. 1-4 and 10-11. Aligning arm 205 may be utilized by a user as a reference point relative to retaining nut 11.

Press mechanism 44 may be any means that is configured to provide a compressive load (e.g., utilizing nut 48) to outboard bearing 16 (e.g., an inner race thereof). Further, press mechanism 44 may include a load sensor or any means for monitoring the compressive load transferred to bearing 16. For example, the indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, the dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 10, as exemplified by stud 100 in FIGS. 1-4 of the indicated co-owned patent, U.S. Pat. No. 8,316,530. Apparatus 20 may be prepared by assembly and filling cavity 56 with a fluid, for example, oil, through an access port (not shown) similar to that occupied by pressure indicator 60. Nut 11 may be loosened or hand tightened prior to mounting apparatus 20, though any light load on nut 11 will typically be relieved with application of tension to spindle 14 by means of rod 40. Apparatus 20 is then mounted to hub assembly 10 by attaching rod 40 to spindle 14 by means of collar 46. As a result, extensions 212, 213 are brought into contact with bearing 16 (e.g., an inner race thereof). Assuming a desired compressive deflection for bearing 16, for example, 0.003 inches, and a corresponding preload, L, the desired target pressure in cavity 56 can be calculated as described in co-owned U.S. Pat. No. 8,316,530.

The loading of bearing 16 may be initiated by advancing, that, is tightening, nut 48, against housing 52 via bearing 62, for example, by means of arms 50. The buildup of pressure in cavity 56 as indicated by pressure indicator 60 may be monitored by the mechanic. The tightening of nut 48 continues until the target pressure is achieved. The hub assembly may be rotated at least once to provide proper seating of the rollers in bearing 16. For example, nut 48 including arm 50 may be rotated three revolutions and such nut handle may then be counter-rotated slightly to arrive at a desired pressure as indicated on a pressure sensor (e.g., gauge 60). Once the target pressure is achieved in cavity 56, and the desired preload is applied to bearing 16, nut 11 may be tightened (e.g., by hand) against inner race 15 to maintain the preload after apparatus 20 is removed. The desired tightening of nut 11 may be determined by positioning one or more of markings 510 on nut 11 relative to aligning arm 205. Also, the hub assembly may be rotated at least once to provide proper seating of the rollers in bearing 16. Upon completion of the preloading, apparatus 20 may be removed from wheel hub assembly 10 and, keeper 530 and retaining member 540 may be engaged with retaining nut 11 and spindle 14 such that keeper teeth 520 engage teeth 511 of nut 11 and engaging member 534 of keeper 530 engage shaft slot 5 of spindle 14. As indicated above, nut 11 may be selectively rotated based on markings 510 and aligning arm 205 such that keeper teeth 520 and engaging teeth 511 engage one another and engaging member 534 engages shaft slot 5 in a manner to inhibit movement of spindle 14 relative to retaining nut 11. As described above, a cover plate or locking member (e.g., cover plate 650, cover plate 750, locking member 850, locking member 950, or locking mechanism 1010) may be utilized to allow a visual inspection of any potential tampering of the endplay of the wheel hub assembly. The wheel may then, for example, be remounted. Variations on this procedure while not deviating from the desired results may be apparent to those of skill in the art.

The preloading of the bearings as described above is advantageous relative to endplate adjustment but was rarely recommended prior to the invention disclosed in co-owned U.S. Pat. No. 8,316,530, due to the difficulty of creating and verifying a correct preload site. The use of a load sensor such as a pressure indicator or gauge 60 along with the selective positioning of retaining nut 11 on spindle 14 (e.g., using arm 205 and markings 510) provide for a repeatable correct and accurate preload setting.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). Apparatus 20 may then be mounted to bearing 16 and spindle 14 (with reference to FIGS. 1-4) and the press mechanism 44 actuated to introduce tension to spindle 14 and compression to bearing 16. (The wheel may be removed.) Press mechanism 44 may be regulated to, for example, vary the fluid pressure, to gradually increase the preload on bearing 16. While the load is increased, a mechanic can repeatedly check the load on or the "tightness" of nut 11. When nut 11 begins to loosen, the existing preload on bearing 16 has been met or exceeded. A comparison of the actual preload indicated by press mechanism 44, for example, the fluid pressure, with the desired preload can then be made. Any adjustments to the preload, either higher or lower, can be made according to the procedures described above and in co-owned U.S. Pat. No. 7,389,579 and co-pending U.S. application Ser. No. 13/719,569 filed on Dec. 19, 2012.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A lock nut system comprising:
a nut;
a keeper engageable with said nut to inhibit movement of said keeper relative to said nut;
said keeper configured to engage a shaft to inhibit rotational movement of said nut relative to the shaft when said keeper engages said nut and said keeper engages the shaft;
a keeper retaining member secured to said keeper, said retaining member engageable with said nut to hold said keeper engaged with said nut; and
a tamper indicating member contacting said keeper retaining member such that a separation of said tamper indicating member from said keeper retaining member deforms said tamper indicating member to provide an indication of tampering to a user.

2. The system of claim 1 wherein said retaining member comprises a notch and said tamper indicating member comprises a tab located at a position relative to said notch of said retaining member such that said tab is deformable into said notch to connect said tab to said retaining member.

3. The system of claim 1 wherein said tamper indicating member comprises an indentation and an external circumference, said indentation providing an opening on said external circumference to allow a portion of said retaining member to be viewed from a side of said tamper indicating member opposite said nut.

4. The system of claim 3 wherein said retaining member comprises an engaging portion engaging said nut, said indentation is located relative to said retaining member to allow the user to view the engaging portion through said opening.

5. A lock nut system comprising:
a nut;
a keeper engageable with said nut to inhibit movement of said keeper relative to said nut;
said keeper configured to engage a shaft to inhibit rotational movement of said nut relative to the shaft when said keeper engages said nut and said keeper engages the shaft;
a keeper retaining member secured to said keeper, said retaining member engageable with said nut to hold said keeper engaged with said nut; and
a tamper indicating member connected to opposite portions of said retaining member such that a separation of said connecting member from said keeper retaining member provides an indication of tampering to a user.

6. The system of claim 5 wherein said retaining member comprises a notch and said tamper indicating member comprises a tab located at a position relative to said notch of said retaining member such that said tab is deformable into said notch to connect said tab to said retaining member.

7. The system of claim 6 wherein said tamper indicating member comprises an indentation and an external circumference, said indentation providing an opening on said external circumference to allow a portion of said retaining member to be viewed from a side of said tamper indicating member opposite said nut.

8. The system of claim 7 wherein said retaining member comprises an engaging portion engaging said nut, said indentation is located relative to said retaining member to allow the user to view the engaging portion through said opening.

9. A method for use in providing a load on a bearing mounted to a shaft, the method comprising:
engaging a keeper with a nut mounted on a shaft to inhibit movement of the keeper relative to the nut;
engaging a retaining member connected to the keeper with the nut to hold the keeper engaged with the nut;
aligning a first pressing member of a plurality of pressing members of a tool with a first tab of a plurality of tabs of a tamper indicating member and pressing the first member against the tab to engage the tamper indicating member to the keeper retaining member such that a separation of the tamper indicating member from the retaining member provides a visual indication to a user.

10. The method of claim 9 wherein the retaining member comprises a notch and the tamper indicating member comprises a tab, and the pressing further comprises deforming the tab into the notch to connect the tamper indicating member to the retaining member.

11. The method of claim of claim 10 wherein the deforming the tab comprises rotating the tab toward the retaining member about a point connecting the tab to a remainder of the tamper indicating member.

12. The method of claim 9 further comprising viewing a portion of the retaining member from a side of the tamper indicating member opposite the nut through an opening bounded by an indentation in an external circumference of the tamper indicating member.

13. The method of claim 12 wherein the retaining member comprises an engaging portion engaging the nut, and wherein the viewing the portion of the retaining member comprises viewing the engaging portion engaging the nut.

14. The method of claim of claim 13 wherein the tab comprises a first tab of a plurality of tabs of the tamper indicating member, the deforming comprises the plurality of pressing member contacting a plurality of tabs of the tamper indicating member to deform the plurality of tabs toward the retaining member.

15. An apparatus for use in connecting a tamper indicating member to a retaining member coupled to a nut mounted to a shaft, the apparatus comprising:
   a plurality of pressing members extending axially from a main body portion;
   a contacting portion coupled to said main body portion and having a plurality of openings aligned with said pressing members to allow a first pressing member of said pressing members to extend through said contacting portion to contact a tab of a tamper indicating member to deform said tab toward a retaining member coupled to a nut mounted on a shaft.

16. The apparatus of claim 15 further comprising a resilient member between said main body portion and said contacting portion to bias said main body portion and said contacting portion away from each other and to bias said pressing member to a retracted position away from said tamper indicating member when a force is not applied to said main body portion toward said tamper indicating member.

17. The apparatus of claim 15 further comprising a first aligning post and a second aligning post connected to said main contacting portion and extending away from said main body portion, said first aligning post and second aligning post spaced from each other such that said first aligning post and second aligning post are receivable in a plurality of spacing openings in the tamper indicating member to align said first pressing member with said tab to allow said first pressing member to deform said tab.

* * * * *